(12) United States Patent
Simula et al.

(10) Patent No.: US 11,421,477 B2
(45) Date of Patent: *Aug. 23, 2022

(54) ACCESS PLATFORM SYSTEM WITH INTEGRATED FOLDING STEPS

(71) Applicant: GSE TECHNOLOGIES, LLC, Houghton, MI (US)

(72) Inventors: Glen Raymond Simula, Hancock, MI (US); Justin Sven LaCosse, Houghton, MI (US)

(73) Assignee: GSE TECHNOLOGIES, LLC, Houghton, MI (US)

( * ) Notice: Subject to any disclaimer, the term of this patent is extended or adjusted under 35 U.S.C. 154(b) by 548 days.

This patent is subject to a terminal disclaimer.

(21) Appl. No.: 16/174,915

(22) Filed: Oct. 30, 2018

(65) Prior Publication Data

US 2019/0085635 A1 Mar. 21, 2019

Related U.S. Application Data

(63) Continuation-in-part of application No. 15/182,788, filed on Jun. 15, 2016, now Pat. No. 10,214,963.

(51) Int. Cl.
| | |
|---|---|
| *E06C 7/14* | (2006.01) |
| *E06C 7/16* | (2006.01) |
| *E06C 1/387* | (2006.01) |
| *E06C 1/39* | (2006.01) |
| *E06C 7/18* | (2006.01) |
| *B60R 3/02* | (2006.01) |
| *E06C 5/04* | (2006.01) |

(Continued)

(52) U.S. Cl.
CPC .............. *E06C 7/16* (2013.01); *B60R 3/02* (2013.01); *B61D 23/025* (2013.01); *E06C 1/387* (2013.01); *E06C 1/39* (2013.01); *E06C 1/393* (2013.01); *E06C 5/04* (2013.01); *E06C 7/182* (2013.01); *E06C 9/08* (2013.01)

(58) Field of Classification Search
CPC ...... E06C 5/02; E06C 5/04; E06C 9/08; E06C 7/16; E06C 1/39; E06C 1/387; B63B 27/14; A62B 1/02; B60R 3/00
See application file for complete search history.

(56) References Cited

U.S. PATENT DOCUMENTS 2,355,924 A * 8/1944 Pescara .................. F02B 71/00
123/46 R
3,237,719 A * 3/1966 Russell .................... E06C 1/12
182/103

(Continued)

FOREIGN PATENT DOCUMENTS

KR       20120133228 A  * 12/2012
WO    WO-2015119505 A1 *  8/2015  ........... B65G 1/0492

Primary Examiner — Colleen M Chavchavadze
Assistant Examiner — Candace L Bradford
(74) Attorney, Agent, or Firm — Brooks Kushman P.C.

(57) ABSTRACT

An access platform system for enabling access to and from ground-based structures, vehicles, and mobile equipment. The system has a main frame that is attached to or juxtaposed with one or more of the ground-based structures, vehicles, and mobile equipment; a vertical platform displacement assembly attached to the main frame; and a folding steps assembly. The vertical displacement mechanism has a multi-stage apparatus for influencing the stroke of lift cylinders. In one embodiment, the folding steps assembly has folding and unfolding steps.

20 Claims, 15 Drawing Sheets

(51) Int. Cl.
   *B61D 23/02*   (2006.01)
   *E06C 1/393*   (2006.01)
   *E06C 9/08*    (2006.01)

(56) References Cited

U.S. PATENT DOCUMENTS

| | | | | |
|---|---|---|---|---|
| 3,756,622 A * | 9/1973 | Pyle | ............ | B60R 3/02 |
| | | | | 280/166 |
| 3,830,342 A * | 8/1974 | Allen | ............ | B66F 9/08 |
| | | | | 187/229 |
| 4,020,920 A * | 5/1977 | Abbott | ............ | B60R 3/02 |
| | | | | 105/445 |
| 4,110,673 A * | 8/1978 | Magy | ............ | H02H 7/0851 |
| | | | | 280/166 |
| 4,124,099 A * | 11/1978 | Dudynskyj | ............ | B60P 1/4414 |
| | | | | 280/166 |
| 4,164,292 A * | 8/1979 | Karkau | ............ | B60R 3/02 |
| | | | | 280/166 |
| 4,264,084 A * | 4/1981 | Telles | ............ | B60R 3/02 |
| | | | | 182/115 |
| 4,618,030 A * | 10/1986 | Campbell | ............ | E06C 7/16 |
| | | | | 248/238 |
| 4,642,953 A * | 2/1987 | DeGood | ............ | E04F 11/06 |
| | | | | 52/185 |
| 5,316,432 A * | 5/1994 | Smalley | ............ | A61G 3/068 |
| | | | | 280/166 |
| 5,425,615 A * | 6/1995 | Hall | ............ | A61G 3/068 |
| | | | | 280/166 |
| 5,549,312 A * | 8/1996 | Garvert | ............ | B60R 3/02 |
| | | | | 280/166 |
| 5,674,043 A * | 10/1997 | Dorn | ............ | A61G 3/06 |
| | | | | 187/222 |
| 6,109,395 A * | 8/2000 | Storm | ............ | B66B 9/0869 |
| | | | | 414/545 |
| 7,080,715 B1 * | 7/2006 | Bowlin | ............ | B25H 5/00 |
| | | | | 280/32.6 |
| 8,397,868 B1 * | 3/2013 | Ferree | ............ | E06C 9/08 |
| | | | | 182/116 |
| D713,772 S * | 9/2014 | Ziaylek | ............ | D12/203 |
| 2001/0050044 A1 * | 12/2001 | Mueller | ............ | F16P 1/00 |
| | | | | 118/324 |
| 2003/0173152 A1 * | 9/2003 | Schmid, Jr. | ............ | E06C 1/387 |
| | | | | 182/86 |
| 2004/0154523 A1 * | 8/2004 | Arias | ............ | B63B 27/14 |
| | | | | 114/343 |
| 2006/0272895 A1 * | 12/2006 | Lavoie | ............ | B60R 3/02 |
| | | | | 182/127 |
| 2008/0053750 A1 * | 3/2008 | Tseng | ............ | E04G 3/30 |
| | | | | 182/82 |
| 2010/0122871 A1 * | 5/2010 | Gottlinger | ............ | E06C 5/02 |
| | | | | 182/106 |
| 2014/0291071 A1 * | 10/2014 | Conde, Jr. | ............ | A62B 1/20 |
| | | | | 182/70 |
| 2015/0060198 A1 * | 3/2015 | Horn | ............ | A62B 1/02 |
| | | | | 182/48 |
| 2015/0275579 A1 * | 10/2015 | Reyes | ............ | E06C 7/12 |
| | | | | 182/103 |
| 2020/0148310 A1 * | 5/2020 | Grimaldi | ............ | B63B 27/16 |

\* cited by examiner

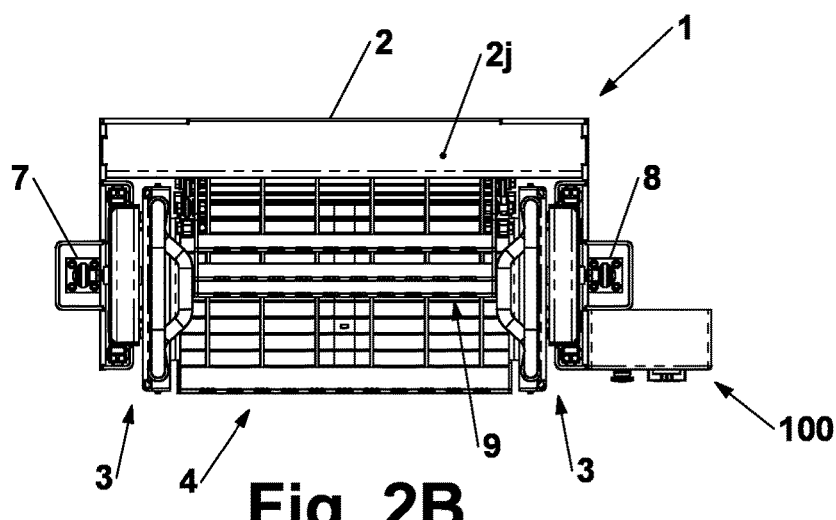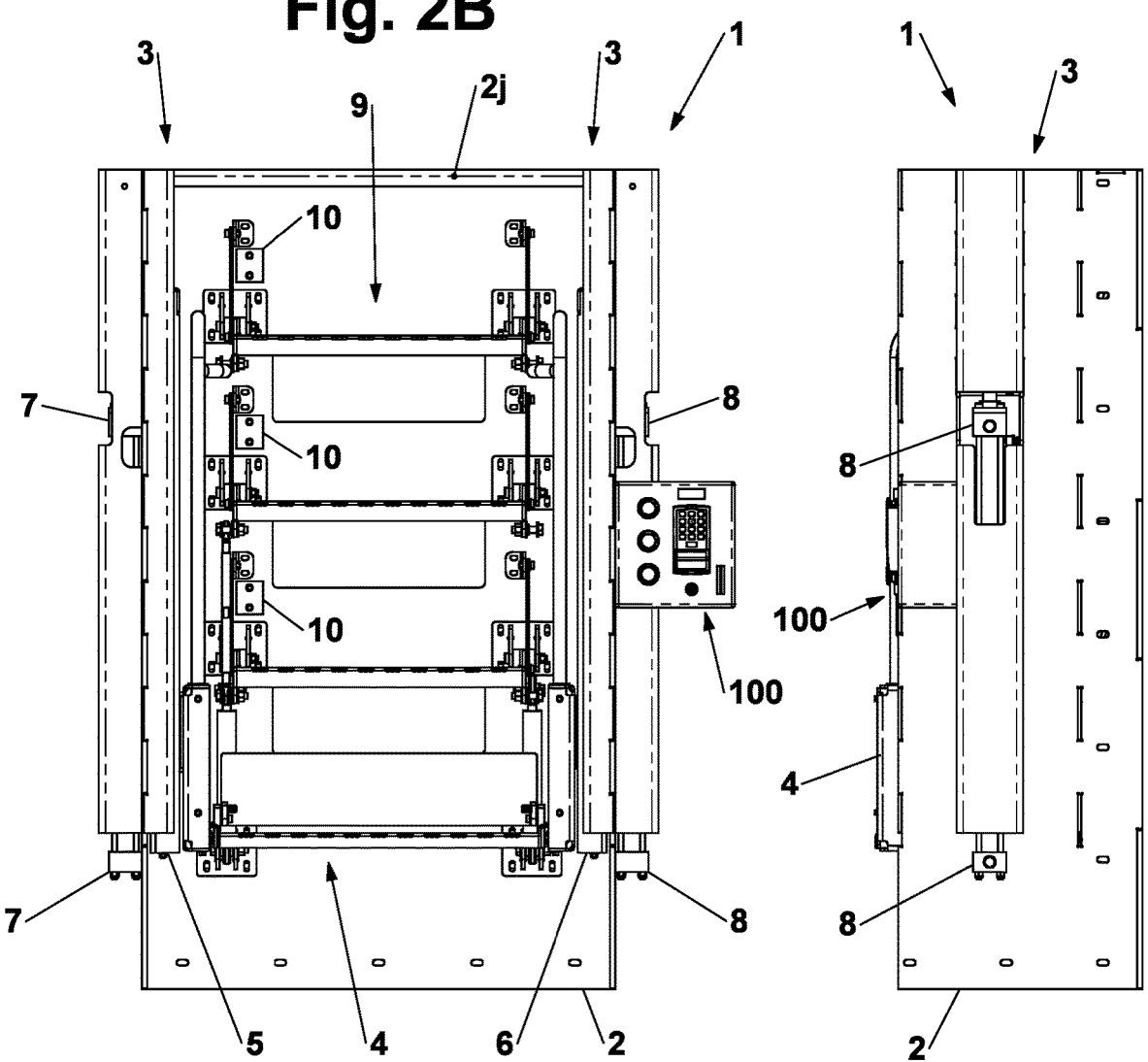

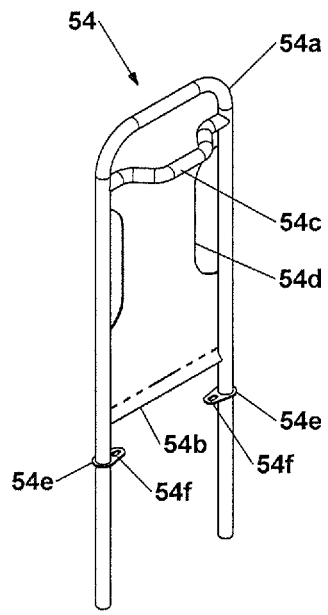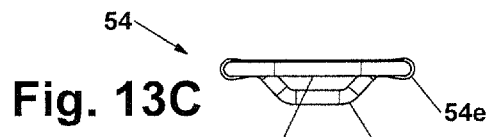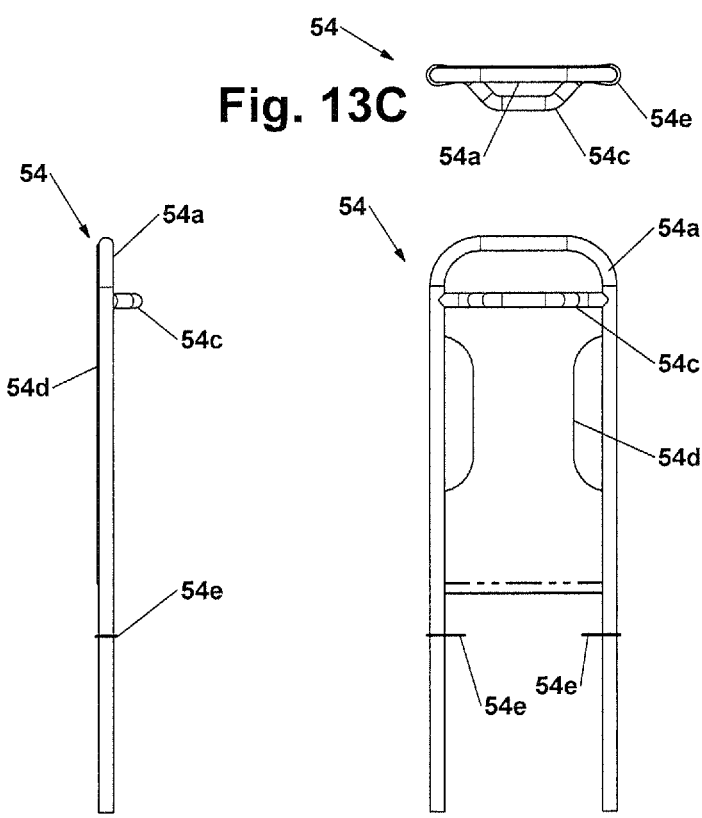
Fig. 13
Fig. 13A
Fig. 13B

ACCESS PLATFORM SYSTEM WITH INTEGRATED FOLDING STEPS

CROSS REFERENCE TO RELATED APPLICATION

This application is a continuation-in-part of U.S. Ser. No. 15/182,788 filed on Jun. 15, 2016, now U.S. Pat. No. 10,214,963 issued Feb. 26, 2019, which is incorporated by reference in its entirety.

FIELD OF THE INVENTION

This disclosure relates to a platform system that provides ease of access to elevated decks, locomotives, vehicle control cabs, and similar areas of industrial vehicles and mobile equipment and ground-based structures by workers, machine operators and other personnel.

BACKGROUND OF THE INVENTION

In the industrial and mobile equipment industries, accidents happen following slips and falls from steps, ladders and stairways. It would be desirable to reduce accident rates by deploying platform systems that enable safe passage into and from large industrial and mobile equipment ground-based structures and machines.

The art considered before filing this application includes U.S. Pat. Nos. 2,355,924; 3,237,719; 3,756,622; 3,830,342; 3,869,022; 4,020,920; 4,110,673; 4,124,099; 4,164,292; 4,264,084; 4,618,030; 4,642,953; 5,033,582; 5,316,432; 5,425,615; 5,549,312; 5,674,043; 5,813,494; 5,988,316; 6,109,395; 6,347,686; 7,080,715; 7,870,932; 8,261,880; 8,397,868; 8,668,048; 8,919,497; U.S. Pub. Nos. 20010050044; 20030173152; 20040154523; 20060272895; 20080053750; 20100122871; 2012/0181109; 20140291071; 20150060198; U.S. Design Pat. No. 713772; GB2523003; Korean Pub. No. 20120133228; and PCT Pub. No. WO2015119505.

SUMMARY OF THE INVENTION

The scope of this disclosure includes and is not limited to platform systems that are adapted for use with train locomotives, large mining and construction haul trucks, loaders, earth moving equipment, large agricultural logging industry equipment, aviation ground service equipment and other vehicle applications and ground-based structures, plus naval marine applications related to large ships and vessels; this term also includes stationary structures or buildings (collectively referenced herein as "equipment").

One aspect of the present disclosure involves an access platform system (referenced herein as "access platform system") that, to enable access to the equipment rises or lowers in relation to the equipment. The access platform system has integrated folding steps supported by a mainframe that is attached or juxtaposed to the equipment to further facilitate the ingress and egress of personnel into and out from the equipment. Generally, the main frame supports two mechanisms:

1. a first mechanism which in one embodiment comprises a lifting or lowering mechanism (collectively referenced herein as "vertical displacement mechanism"; this term is meant to be construed as vertical, sloped or inclined, but for brevity herein, the term "vertical" is used) which in one embodiment has a rising and lowering platform assembly on which personnel may stand or ride for the purpose of raising them to an elevated level and lowering them to a lower level or ground level; and
2. a second mechanism which in one embodiment includes a folding steps assembly that may be stored in a compact and efficient folded-up configuration during use of the access platform system, or otherwise optionally deployed and folded for access to equipment by personnel when the access platform system is not being used.

As later described more fully, several embodiments of the access platform system include features relating to obstruction detection, user safety and durability improvements, remote activation, and access denial.

BRIEF DESCRIPTION OF THE DRAWINGS

FIG. 2 is a front view of the embodiment shown in FIG. 1;

FIG. 2A is a right side view of the embodiment shown in FIG. 1.

FIG. 2B is a top view of the embodiment shown in FIG. 1.

FIG. 5A is a front view of the main frame subassembly shown in FIG. 5;

FIG. 5B is right side view of the main frame subassembly shown in FIG. 5A;

FIG. 5C is top view of the main frame subassembly shown in FIG. 5A;

FIG. 5D is a first detail view of the main frame subassembly shown in FIG. 5.

FIG. 5E is a second detail view of the main frame subassembly shown in FIG. 5.

FIG. 6A is a front view of the left intermediate carriage assembly shown in FIG. 6;

FIG. 6B is a right side view of the left intermediate carriage assembly shown in FIG. 6;

FIG. 6C is a top view of the left intermediate carriage assembly shown in FIG. 6;

FIG. 6D is a detailed view of the left intermediate carriage assembly shown in FIG. 6;

FIG. 6E is a detailed view of the left intermediate carriage assembly shown in FIG. 6;

FIG. 10A is a front view thereof;

FIG. 10B is right side view thereof;

FIG. 10C is a top view thereof;

FIG. 10D is a detailed view thereof;

FIG. 11A is a first detail view of the exploded front upper left perspective view of the vertical displacement mechanism shown in FIG. 11;

FIG. 11B is a second detail view thereof;

FIG. 13 is a front upper left perspective view of a left handrail assembly also shown in FIGS. 1 through 4 and 10;

FIG. 13A is a front view of the left handrail shown in FIG. 13.

FIG. 13B is a right side view of left handrail shown in FIG. 13.

FIG. 13C is a top view of the left hand rail shown in FIG. 13.

DESCRIPTION OF THE PREFERRED EMBODIMENTS

Figure 1:
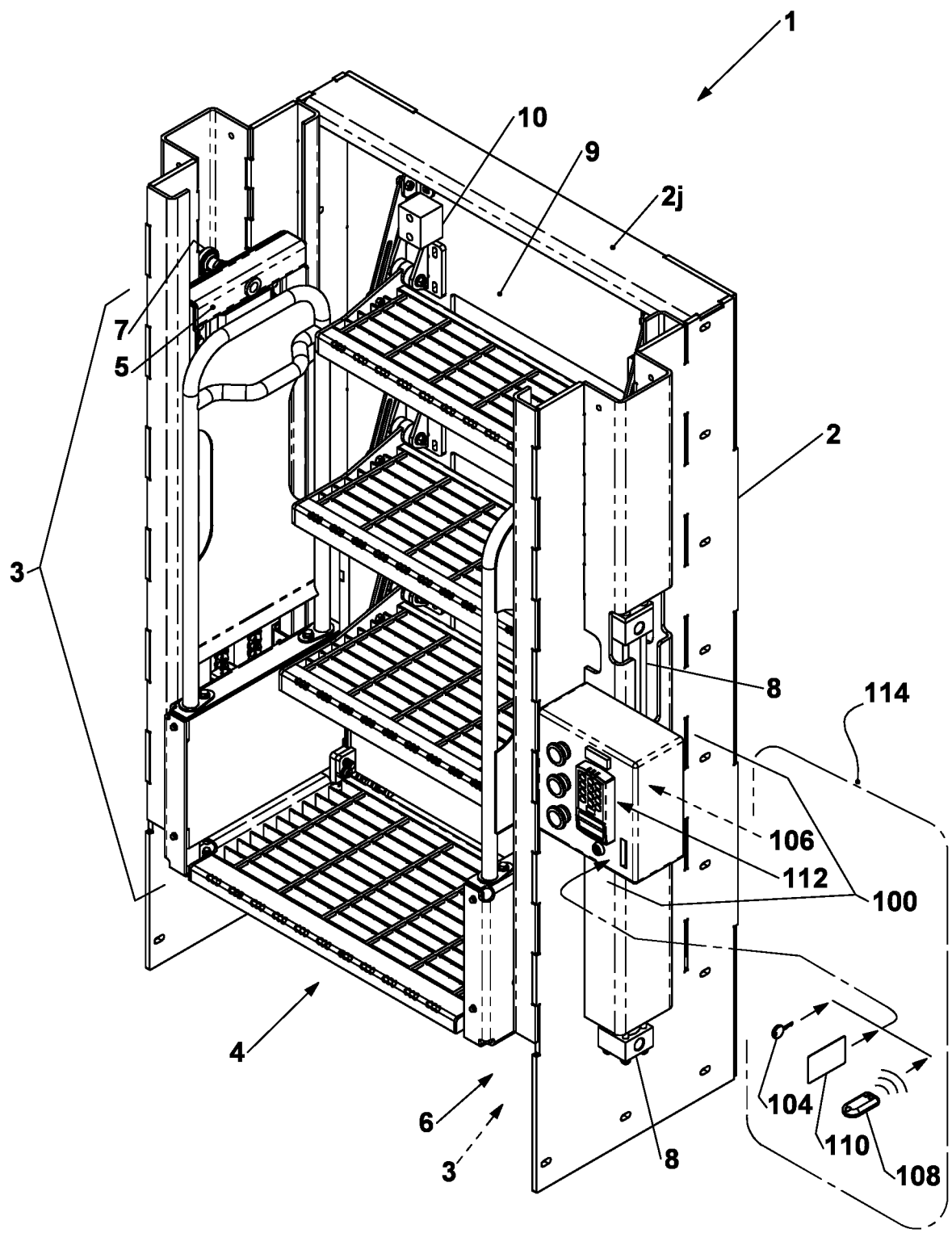
FIG. 1 is a three-quarter upper left front perspective view of an access platform system, a vertical displacement mechanism, and a folding steps assembly in accordance with one embodiment of the present disclosure.

Referring to the drawings and the illustrative embodiments depicted therein, FIGS. 1 through 4 depict an embodiment of a rising and lowering platform vehicle or structure access system 10 ("access platform system") with a folding steps assembly 9. In one embodiment, the access platform system has a main frame 2 that supports two cooperating mechanisms.

Figure 6:
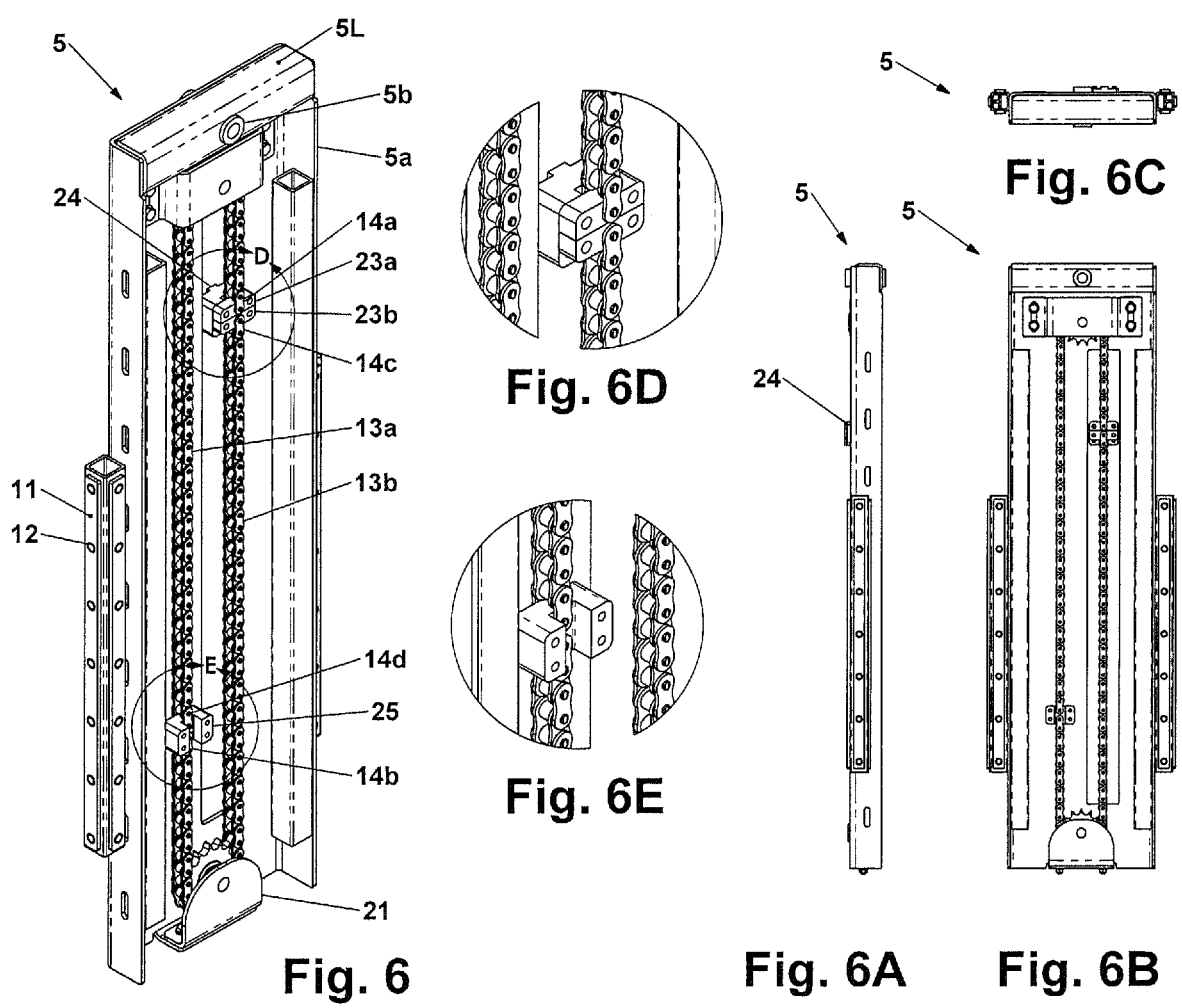
FIG. 6 is a front upper left perspective view of a left intermediate carriage assembly shown in FIGS. 1 through 4.
Figure 7:
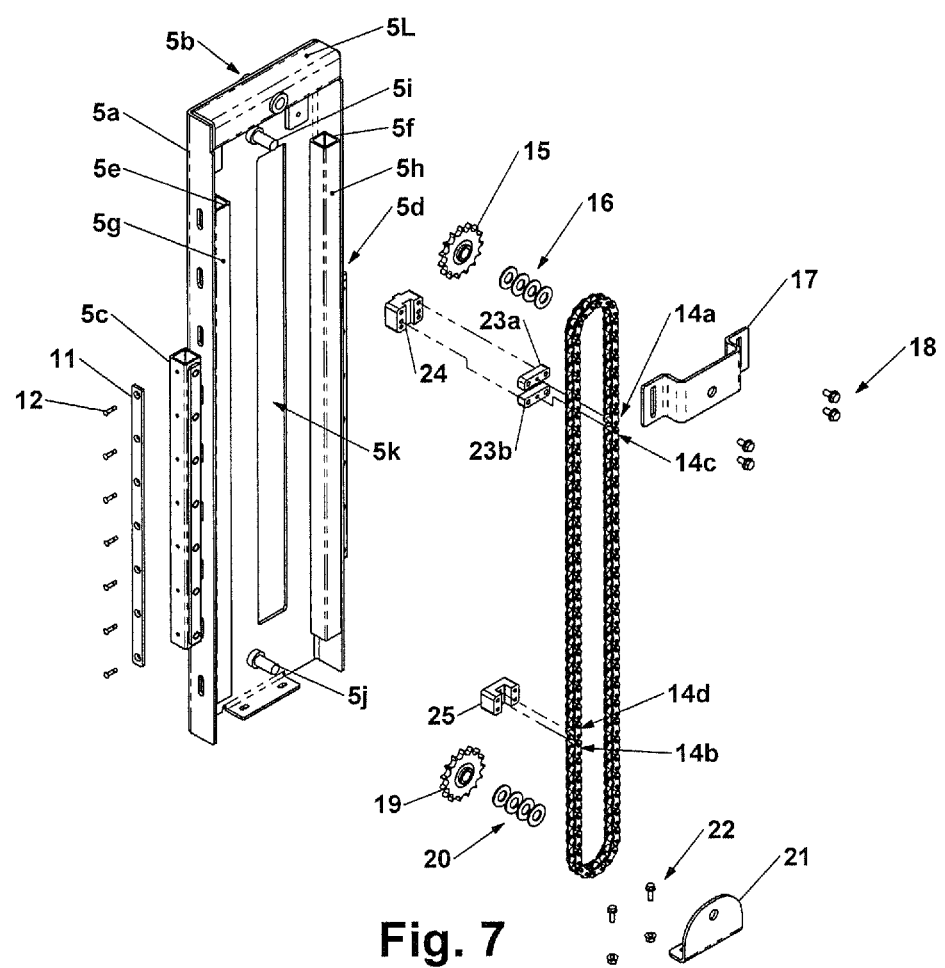
FIG. 7 is an exploded front upper left perspective view of the left intermediate carriage assembly also shown in FIGS. 1 through 4 and 6.
Figure 8:
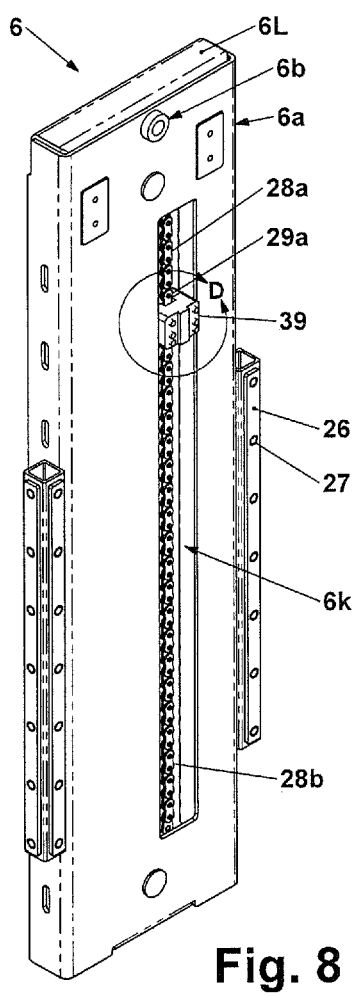
FIG. 8 is a front upper left perspective view of a right intermediate carriage assembly also shown in FIGS. 1 through 4.
Figure 8A:
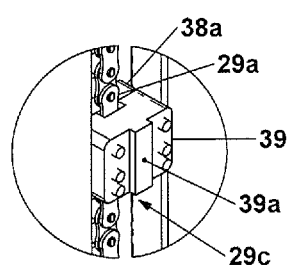
FIG. 8A is a front view of the right intermediate carriage assembly shown in FIG. 7.
Figure 8B:
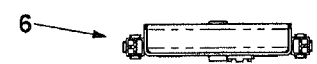
FIG. 8B is a right side view of the right intermediate carriage assembly shown in FIG. 8.
Figure 8C:
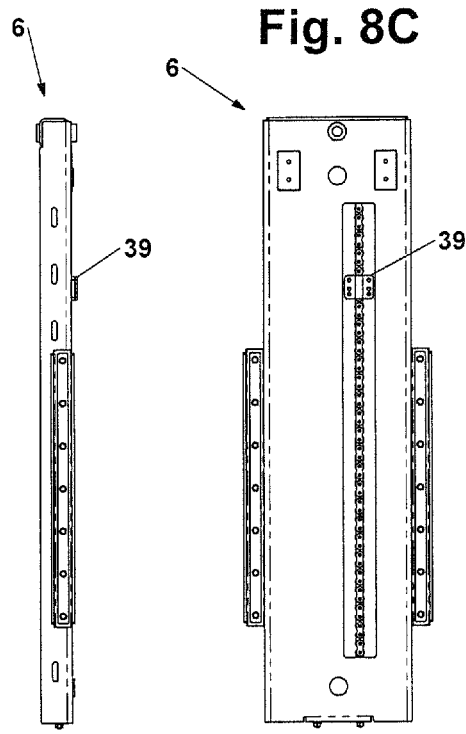
FIG. 8C is a top view of the right intermediate carriage assembly shown in FIG. 8.
Figure 8D:
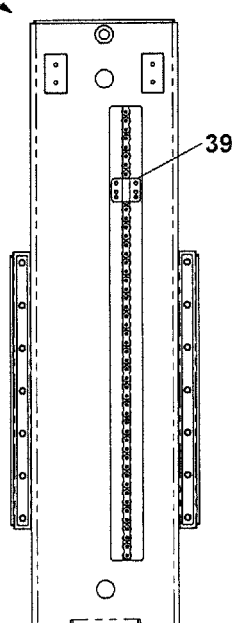
FIG. 8D is a detailed view of the right intermediate carriage assembly shown in FIG. 8.
Figure 9:
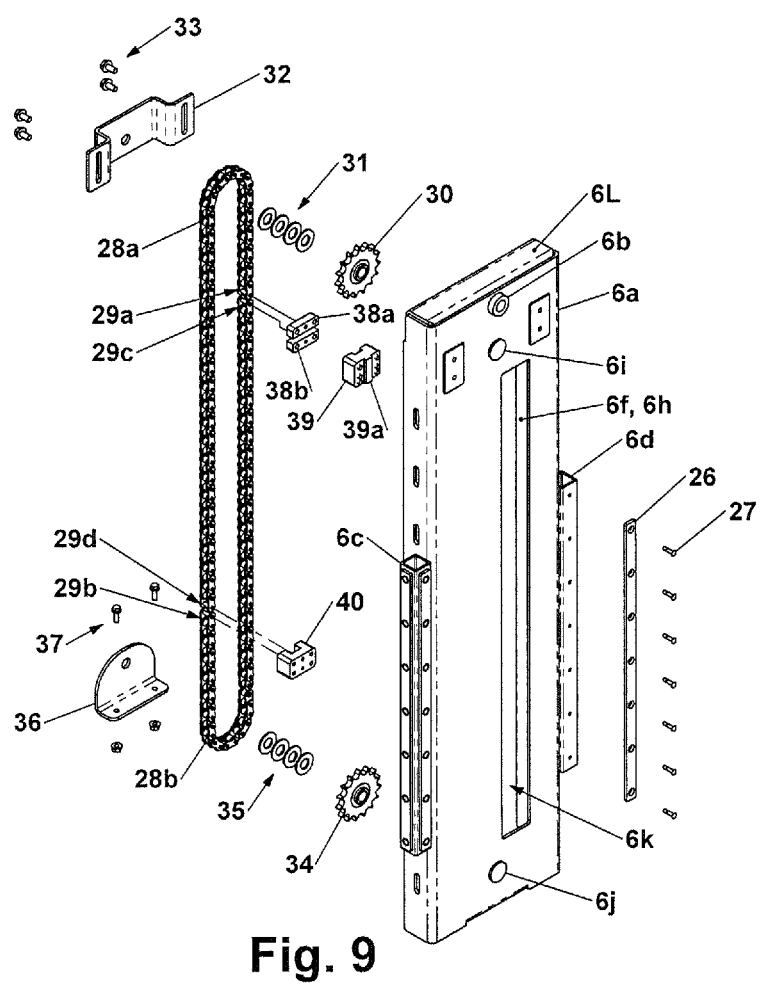
FIG. 9 is an exploded front upper left perspective view of the right intermediate carriage assembly also shown in FIGS. 1 through 4 and 8.

Generally, the first mechanism includes a lifting or lowering mechanism (collectively "vertical displacement mechanism") 3 which includes a movable platform assembly 4, a left intermediate carriage assembly 5, a right intermediate carriage assembly 6, a left lift cylinder 7, and a right lift cylinder 8. These cylinders may be pneumatic or hydraulic, but for consistency herein are collectively termed "hydraulic"). As illustrated in FIGS. 1 and 3, this vertical displacement mechanism 3 has a multi-, preferably two-stage mechanical apparatus that is capable of doubling the stroke of the hydraulic lift cylinders. This is accomplished by for example a set of roller chains or belts or other transmission means (collectively "chains", FIG. 6) that support the rising platform assembly 4 at each side. The chains travel around a set of sprockets or drivers (collectively, "sprockets") that are supported on each side by the intermediate carriage assemblies 5 and 6. Thus, a mechanical advantage is provided within the intermediate carriage assemblies 5 and 6 which move together at the same speed and through the same vertical distance provided by the lift cylinders. The roller chains and sprockets move together within the intermediate carriage assemblies 5 and 6, to preferably double the speed and travel range of motion of the rising platform assembly 4.

The travel speed and motion of the hydraulic lift cylinders is preferably equalized by controlling both the pressure and flow of hydraulic fluid provided to the cylinders through various means and methods that include for example flow dividers, pressure compensators, electronic flow controls and valves and third cylinder circuit arrangements 106, and the like for example, which may be optionally included to operate the present disclosure within a complete prime mover and hydraulic or pneumatic system package (not shown).

In one embodiment, control logic is provided that communicates with the hydraulic lift cylinders to prevent damage to the system if an obstacle is encountered which prevents or interferes with the free movement of the system. Examples of obstructions which may prevent normal operation include snow and ice buildup, debris on the ground under the main lifting platform, or debris buildup on moving components of the system. Methods of detection include current sensing devices on the upper step of the folding steps assembly 9 and/or main platform motors, and providing timeout limits for each function. If the pre-set time or current thresholds are exceeded, indicating a blocked or jammed condition, the platform system 1 returns to a home configuration and a light and/or auditory signal is activated to alert the user to clear the obstruction.

The left intermediate carriage assembly 5 and right intermediate carriage assembly 6 each preferably include guide bearings (preferably of a glissile material like plastic) for vertical sliding engagement with vertical channel members incorporated within the main frame 2. Likewise, both the left and right sides of the rising platform assembly 4 also preferably include guide bearings for vertical sliding engagement with vertical interior guide members within the left intermediate carriage assembly 5 and right intermediate carriage assembly 6. This permits free vertical movement, mechanical alignment and guidance during relative motion of the assemblies during operation.

In one embodiment, a compliant linear bearing mount is provided on the lifting platform. This allows some deflection to occur under extreme loading scenarios without binding.

The doubling of the stroke or travel dimension of the lift cylinders at the rising platform assembly 4 is advantageous. This multi-, preferably two-stage mechanical feature allows the rising platform assembly 4 to be initially set at a normal or otherwise parked and generally accessible position where the step member 46 is at an approximate height above the ground comparable to the heights of most permanently-mounted first steps for a given vehicle or mobile equipment application. Then, when a worker or machine operator ("person") approaches the access platform system 1 at ground level, this first mechanism, or vertical displacement mechanism 3, can be power-activated by a control switch to engage and automatically lower the step member 46 to become extended downwardly approximately 10 inches (25.4 cm) as shown in FIG. 3A for example, below that of the initial or normal and parked position.

Occupant detection devices optionally may be added to sense when an operator has boarded the platform system 1. These devices include for example a foot switch which is activated by a user's weight, and/or a proximity switch which detects the presence or absence of a user in a stairwell. When a user is detected, certain functionality is disabled to prevent injury. For example, if a user is present on the steps, the system cannot be called to the full up or full down positions. Such detection devices improve safety for users and other personnel near the platform system.

With the rising platform assembly 4 now set to its lowest position, the person can then more easily and safely step up and onto the rising platform assembly 4 with relative ease and minimal risk of injury. Once standing upon the rising platform assembly 4, the person can then again activate a control switch to cause the access platform system 1 to raise the platform assembly 4 and himself as he remains positioned (i.e., standing or seated if non-ambulatory) upon it, to the desired maximum height and deck elevation level corresponding to the top-most portion of main frame 2. Once at the desired maximum height deck elevation, the person can then step off and exit the rising platform assembly 4 onto an adjacent stationary elevated deck or platform (not shown) associated with the equipment to which access is desired leading away from the rising platform assembly 4, again with relative ease and minimal risk as compared to what typical permanently fixed steps and stairways for example, are able to provide.

The reverse process of lowering the person from the height of the adjacent stationary elevated equipment, e.g., structure, deck or platform (not shown) back to ground level is accomplished in the approximate reverse sequence of the lifting or raising process with comparable ease and minimal hazard. Automated ease of ingress and egress involving large elevated vehicles or mobile equipment applications by workers or machine operators represents one benefit of the present disclosure.

Generally, the second mechanism includes a folding steps assembly 9 as shown in FIGS. 1 through 4, 14, 14A, and 15. This assembly 9 when folded-up to allows the lifting platform 4 to freely move upwardly and downwardly under power by activating a control switch to engage selected power and control. In the folded down or deployed position all the steps are secured in place. This mode of operation requires no external power to permit normal and traditional ingress and egress of persons involving large elevated vehicles or mobile equipment if power is turned off or as the result of a power outage, for example. This default mechanical configuration feature represents another advantage of the present disclosure.

Figure 3B:
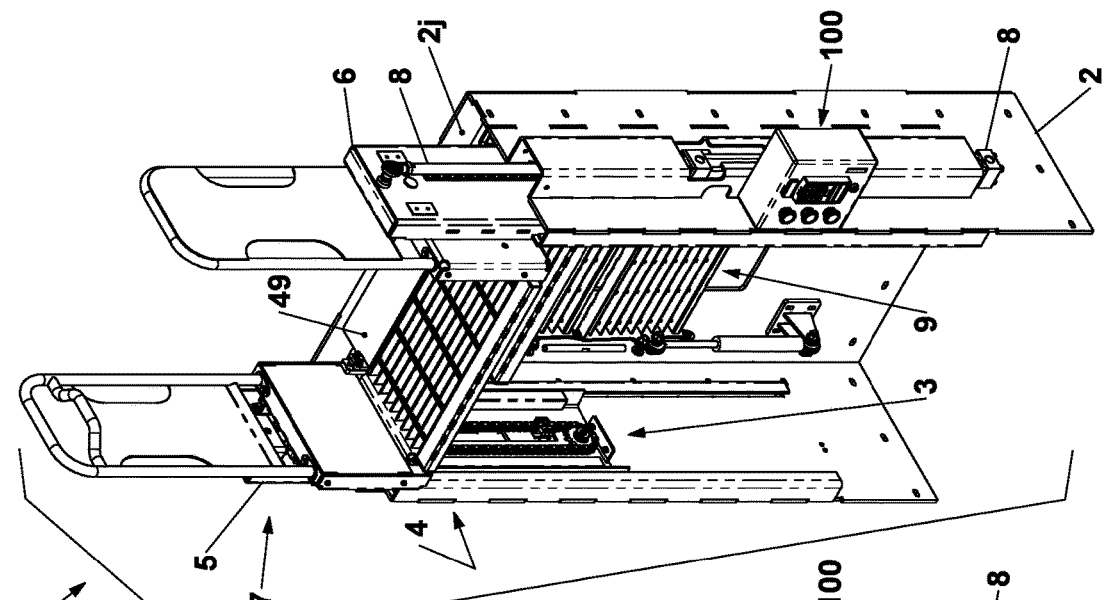
FIG. 3B a three-quarter front upper left perspective view of the access platform system shown in FIGS. 1 and 3 with the platform at the fully raised position and with the folding steps folded fully upward.
Figure 3A:
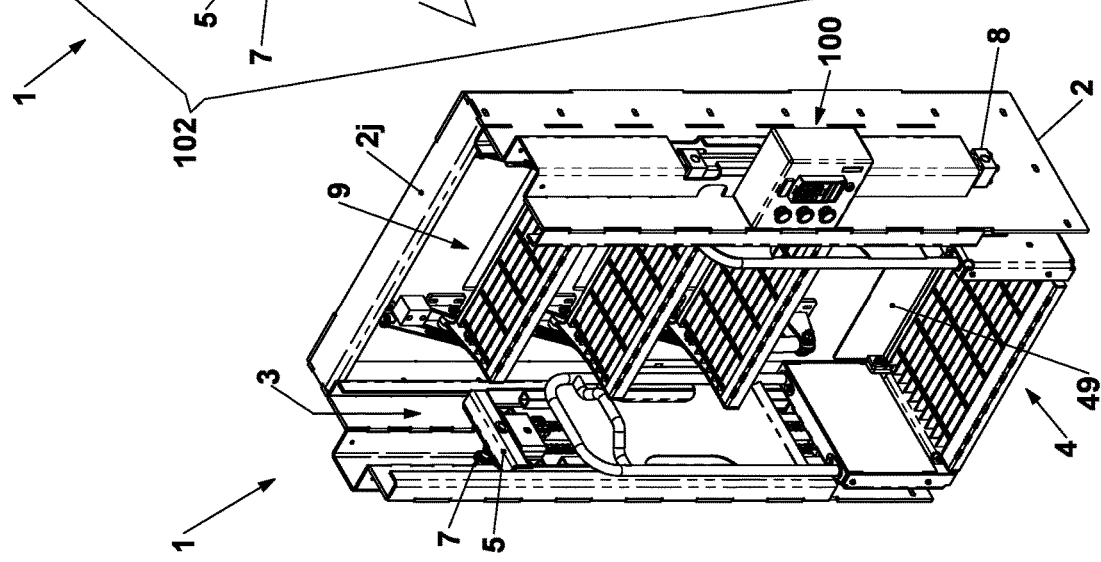
FIG. 3A a three-quarter front upper left perspective view of the access platform system shown in FIGS. 1 and 3 with the platform at the fully lowered position and with the folding steps deployed.
Figure 3:
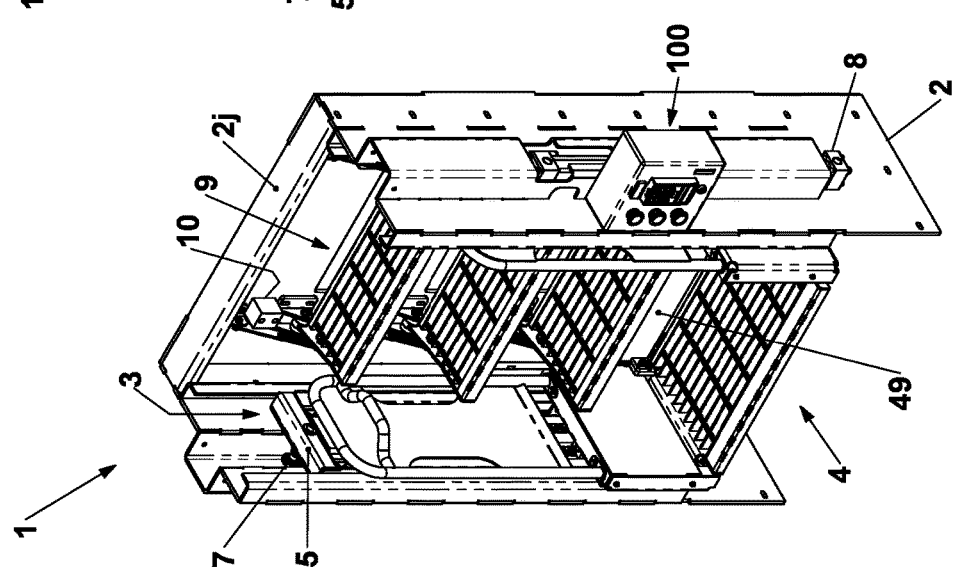
FIG. 3 resembles FIG. 1 but is of a smaller scale to facilitate a side-by-side comparison with FIGS. 3A & 3B.
Figures 14, 14A:
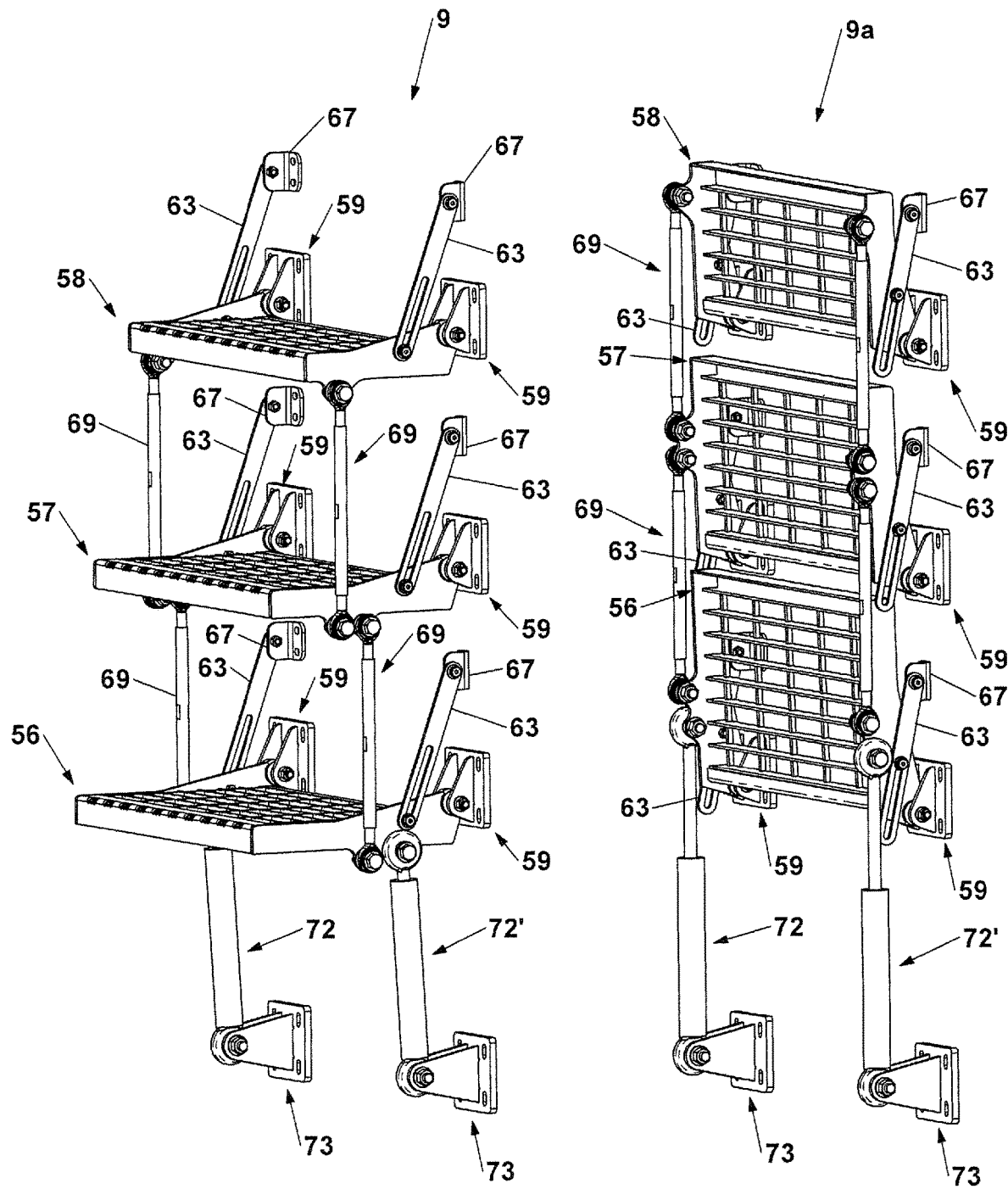
FIG. 14 is a front left upper perspective view of the folding steps assembly shown in FIGS. 1 through 4, with the steps deployed.
FIG. 14A is a front left upper perspective view of the folding steps assembly shown in FIGS. 1 through 4, with the steps folded.
Figure 15:
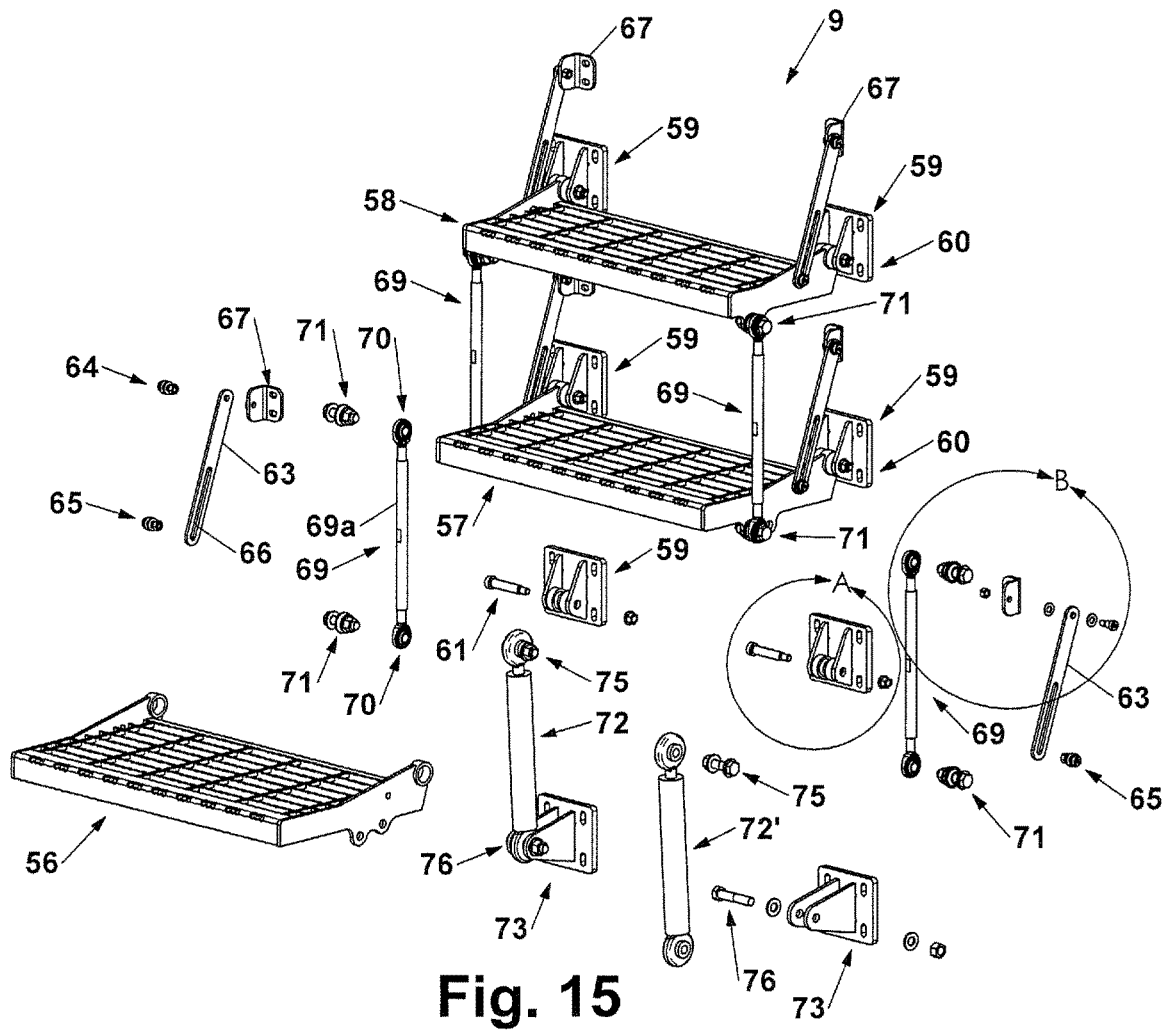
FIG. 15 is a partially exploded front left upper perspective view of the folding steps assembly shown in FIGS. 1 through 4 and 14, with the steps deployed.
Figure 15A:
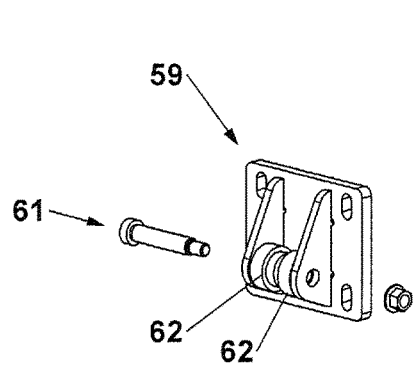
FIG. 15A is a detailed view of the folding steps assembly shown in FIG. 15.
Figure 15B:
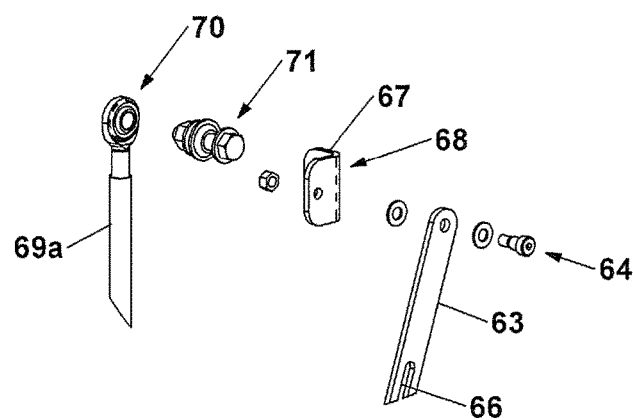
FIG. 15B is a detailed view of the folding steps assembly shown in FIG. 15.

Optionally as shown in FIGS. 3B and 14A, the folding steps assembly 9 may be stored in a folded-up configuration 9A and effectively locked-out from unauthorized personnel whenever large elevated vehicles or mobile equipment are shut-down or otherwise parked for periods of non-use. This mechanical configuration is a means for denying access 102. It can provide an added level of security and equipment property protection by generally hindering access to equipment by unauthorized personnel and individuals should vehicles remain unattended at remote or unmonitored locations. Thus, the ability to effectively fold-up and lock-out the folding steps assembly 9 from unauthorized use represents another aspect of the present disclosure.

If desired, means for remote activation may be provided. If a user wishes use the system, he will have the option of calling the system, using for example a fob device, RFID keycard, keypad, or other commonly used security technology. If an operator of for instance the locomotive desires, this method can be used to improve safety and security of the system by only allowing it to be used when the fob or comparable device is in close proximity to the platform system. This will help ensure that only trained and qualified personnel are able to activate the locomotive access system.

Further, an access denial setting may be added to the control system described above. Currently, there may be no method to prevent unauthorized users from climbing aboard a locomotive in an unsecured location. The locomotive access system has the ability to prevent entry by folding the steps and raising the lift platform to deck height. Adding this setting to the control system enables an operator to "lock" the locomotive, preventing unauthorized access to the locomotive. The system can be locked and unlocked using a remote fob 108, RFID keycard 110, keypad, or other commonly used security technology 114.

For reference the overall general dimensions of one exemplary mechanized portion of the access platform system with integrated folding steps 1 is approximately 42 inches (1.07 m) wide by 18 inches (0.36 m) deep by (1.57 m) in height with the rising platform assembly 4 in the normal parked position. The general dimensions of the rising platform step member 46 are approximately 24 inches (0.61 m) wide by 14 inches (0.36 m) in depth. The rising platform assembly 4 including the step member 46 has a travel capability of approximately 60 inches (1.52 m) vertically. The overall size of the apparatus including the example dimensions may be changed by design or otherwise selected according to the particular requirements and foreseeable selected custom industrial application. Optionally and preferably, the disclosed apparatus may be custom-designed and manufactured for each specific application by customer specifications according to published industrial mobile equipment and/or vehicle ingress and egress standard safety guidelines for workers, vehicle operators and personnel. One goal is to meet any necessary safety requirements for safely reaching, stepping and standing upon the rising platform assembly 4, and optionally climbing or descending the folding steps mechanism 9, during normal use of the functional system package while meeting desired end-user of customer requirements.

Additionally, a particular design application may further include optional, additional and various handrails, handles, hand holds, and safety guards which may be anticipated according to applicable safety standards. These however are not shown within the Figures as these added components are likely to vary significantly according to specific applications of the disclosure.

Figure 5:
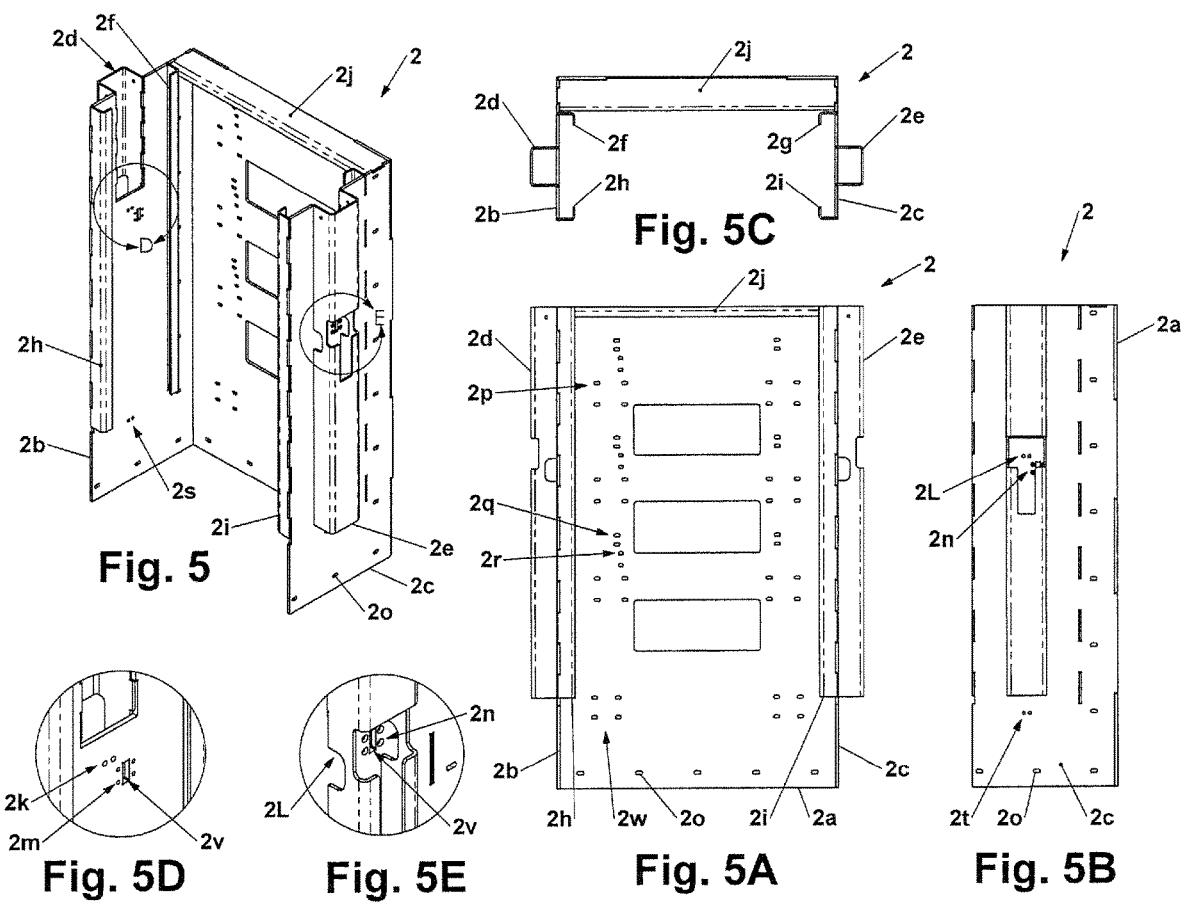
FIG. 5 is a front upper left perspective view of the main frame subassembly also shown in FIGS. 1 through 4.

FIGS. 5 through 5E show in an alternative embodiment further details and the construction of the main frame 2. Main frame 2 may be typically fabricated from mild sheet steel, aluminum, or other suitable structural materials. If weldable metals are used, the pieces may be, cut, fitted, and joined together by welding to form a single welded unit. Such pieces may include the main side support plate 2c, left side hydraulic lift cylinder enclosure 2d, right side hydraulic lift cylinder enclosure 2e and/or the top plate 2j. Lift cylinder enclosures 2d and 2e additionally provide added mechanical strength and stiffness to the respective sides 2a and 2c of main frame 2.

Along the side portions of main frame 2 a series of spaced vertical and horizontal structural mounting holes 2o can be provided if desired. These may be optionally included along the vertical sides 2a and 2c of main frame 2 to attach the entire assembly by some types of fasteners to another framework for example of a mobile equipment or vehicle chassis. Optionally, main frame 2 may be directly welded or otherwise secured in place as desired without the use of fasteners. It may be noted that top plate 2j of main frame 2 generally represents the maximum design height or elevation where the lifting platform 4 stops when reaching full height during lift modes of operation. The design height may be generally adjusted and selected according to a particular application, where the number of folding steps, as well as the vertical spacing of the steps may also be varied by design as a particular application, including the dimensional requirements for total height, are identified and met.

Additionally, internal vertical members of main frame 2 include left rear guide channel member 2f, right rear guide channel member 2g, left front guide channel member 2h, and right front guide channel member 2i. These internal members serve as guides or channels that provide vertical sliding freedom of movement, lateral support and guidance of left intermediate carriage assembly 5 and right intermediate carriage assembly 6 as they are moved up and down vertically within main frame 2 by the respective lift cylinders 7 and 8.

Figure 4:
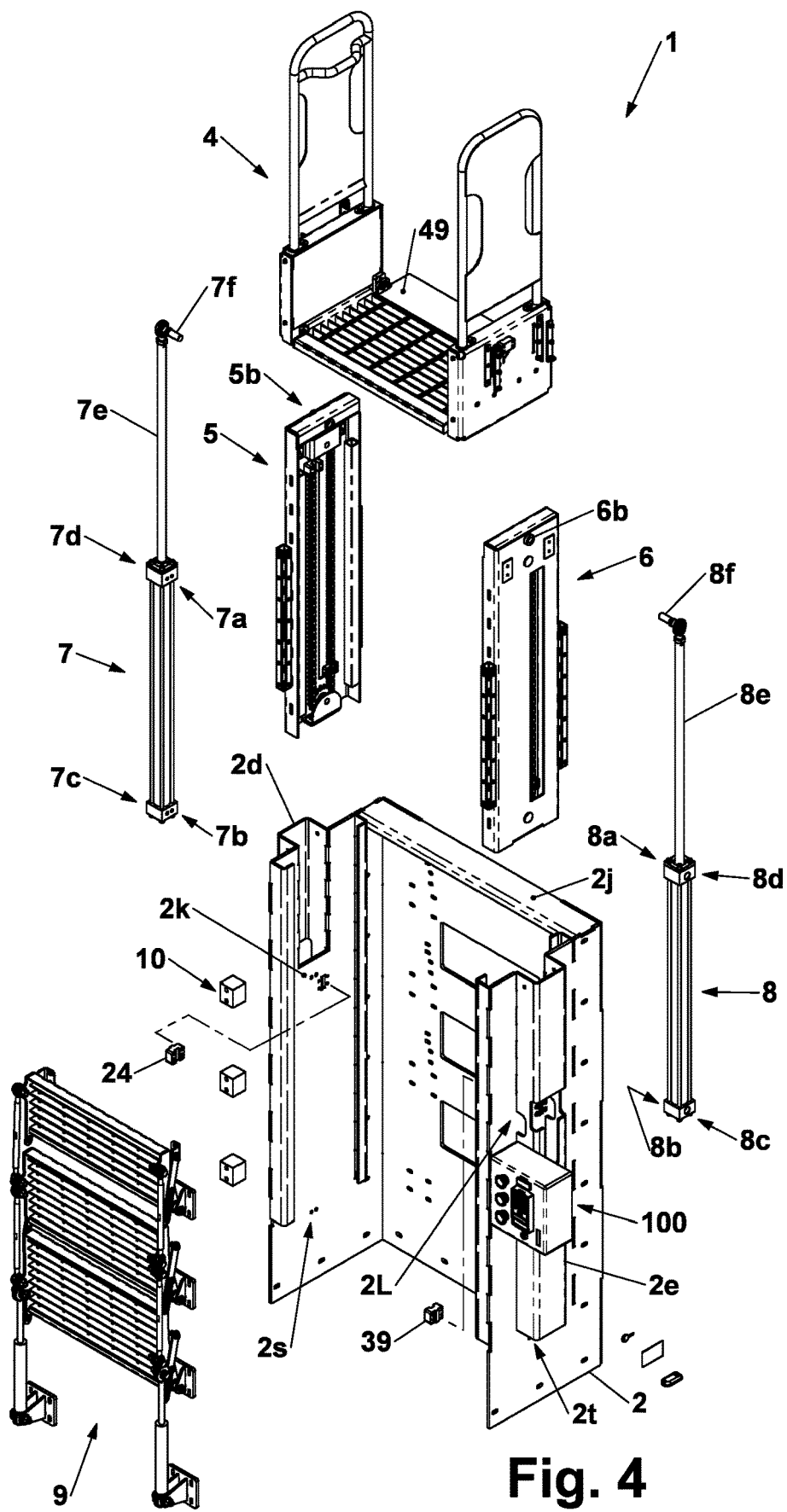
FIG. 4 is an exploded view of the access platform system shown in FIG. 3 illustrating the primary subassemblies of the present disclosure.

As shown in FIG. 4, vertical displacement mechanism 3 is powered for the lifting and lowering action of the lifting platform 4 (in one embodiment) by a pair of hydraulic or pneumatic cylinders or actuators. They include a left lift cylinder 7 and a right lift cylinder 8 which are securely attached by fasteners (not shown) to the main frame 2. Left hydraulic lift cylinder upper mounting holes 7a and right hydraulic cylinder mounting holes 8a, attach respectively to the main frame 2 at left hydraulic lift cylinder upper mounting holes 2k, and right hydraulic lift cylinder upper mounting holes 21. Left lift cylinder lower mounting holes 7b and right cylinder lower mounting holes 8b, attach respectively to the main frame 2 at left lift cylinder lower mounting holes 2s and right lift cylinder lower mounting holes 2t. When secured in place the respective lift cylinders 7 and 8 are firmly attached at the respective sides of the main frame 2 and generally contained within the left and right side lift cylinder enclosures 2d and 2e respectively. Openings at the bottom and sides of cylinder enclosures 2d and 2e provide access for fluid fitting connections and lines (not shown) to the left and right lift cylinder extend hydraulic ports 7c and 8c respectively, and left lift cylinder retract hydraulic ports 7d and 8d respectively. In another embodiment, one or more electric motors, sprockets and chains (or pulleys and belts) replace hydraulic cylinders.

Further details of the two-stage platform vertical displacement mechanism 3 now follow. The two-stage vertical displacement mechanism 3 that vertically moves the rising platform assembly 4 preferably has a pair of intermediate carriage assemblies—a left intermediate carriage assembly 5 and a right intermediate carriage assembly 6. As shown in FIG. 4, the left hydraulic lift cylinder rod end attachment 7f of left hydraulic lift cylinder rod 7e is attached to left intermediate carriage 5 at left hydraulic lift cylinder upper mounting tube 5b. Likewise, the right hydraulic lift cylinder rod end attachment 8f of right hydraulic lift cylinder rod 8e is attached to right intermediate carriage 6 at right hydraulic lift cylinder upper mounting tube 6b.

As shown in greater detail in FIGS. 6, 6A, 6B, 6C, 6D, 6E and 7, the left intermediate carriage 5 preferably has a structural frame 5a which may be may be typically fabricated from cut, machined, bent, or formed mild steel, aluminum or other suitable materials and common shape structural members, fitted and welded together into a single welded unit for example. A left side hydraulic lift cylinder upper mounting tube 5b generally in shape of a round tube extends through square tube support member 5L and is welded into place for load bearing strength. A front exterior guide member 5c and a rear exterior guide member 5d are fastened, e.g. by welding into place at the front and rear faces of structural frame 5a. Front interior guide member 5e and rear interior guide member 5h include a square structural tube that is welded into place at the interior front and rear surfaces respectively of structural frame 5a. Upper sprocket shaft 5i and lower sprocket shaft 5j each extend through the wall of structural frame 5a and are welded into place for load bearing strength. A main frame left chains anchor block elongated clearance opening 5k provides a clearance path for the main frame left chains anchor block 24 as it extends through this opening and is attached to the main frame 2. Additionally, as the left intermediate carriage 5 is raised and lowered within main frame 2, it slides at (in one embodiment) six exterior guide bearings 11, which are preferably comprised of plastic (or other optional suitable surface contact bearing materials), and are attached to intermediate carriage 5 by a series of exterior guide bearing fasteners 12. The six exterior guide bearings 11 (three at the front and three at the rear) slidably engage within the vertical channels effectively provided at main frame 2 by left rear guide channel member 2f and left front guide channel member 2h. Likewise, the three exposed sides of front interior guide member 5e, and the three exposed sides of rear interior guide member 5f comprise front interior guide member sliding surfaces 5g, and rear interior guide member sliding surfaces 5h respectively, for vertical sliding engagement of left intermediate carriage 5 within the main frame 2.

Top roller chain 13a of the left intermediate carriage 5 engages upper sprocket 15 for free rotation at upper sprocket shaft 5i, and is held into place by sprocket spacer washers 16, upper sprocket retainer plate 17, and retainer plate fasteners 18. Bottom roller chain 13b of the left intermediate carriage 5 engages lower sprocket 19 for rotation at lower sprocket shaft 5j, and is held into rotatable position by sprocket spacer washers 20, lower sprocket retainer plate 21, and retainer plate fasteners 21. The top roller chain 13a and bottom roller chain 13b are each connected to left roller chains rising platform anchor block 25 by master links 14d and 14b. Likewise, the opposite ends of top roller chain 13a and bottom roller chain 13b are each connected to left top roller chain frame anchor block 23a, and left bottom roller chain frame anchor block 23b by roller chain master links 14a and 14c. These two small anchor blocks (23a and 23b) are then fastened by four threaded cap screws (not shown) to larger left roller chains main frame anchor block 24, which is further fastened by four additional threaded cap screws (not shown) at left roller chains anchor block mounting holes 2m (shown in detail in FIG. 5d) of main frame 2.

A rectangular protrusion 24a is provided at left roller chains main frame anchor block 24 for the purpose of further engaging and securing main frame left roller chains anchor block 24 within rectangular opening 2u (shown in detail in FIG. 5D) of main frame 2. The purpose of this is to provide additional strength, reliability, and self-location of the anchor block 24 at main frame 2, such that a transfer of the expected vertical shear force loads from the roller chains 13a and 13b into the main frame 2 need not entirely rely upon the strength of the four left anchor block fasteners (not shown). Thus, the rectangular protrusion 24a at left roller chains main frame anchor block 24 engaged with main frame left roller chains anchor block rectangular opening 2u provides an effective and more robust and positive keyed mechanical connection.

The multi, preferably two-stage mechanical apparatus that provides the doubling of the stroke dimension of the hydraulic lift cylinders at the rising platform assembly 4, is provided for example, when left intermediate carriage 5 is raised a given distance by the left hydraulic lift cylinder 7. In this instance the chains and sprockets also advance upward by the same distance along with the left intermediate carriage 5. However, because each end of the left roller chains 13a and 13b are fixed at one end to the main frame 2, by chain anchor blocks 23a, 23b, and 24, the left roller chains rising platform anchor block 25 is caused to advance upward at twice the speed and distance as that of the vertical movement of left intermediate carriage 5. Concurrently, since the left roller chains rising platform anchor block 25 are also fastened (by threaded cap screws for example; not shown) to the rising platform assembly 4, the rising platform assembly 4 also advances upward at twice the speed and distance as that of the left intermediate carriage 5. Thus, the two-stage advantage of the vertical displacement mechanism 3 at the left side of the apparatus is provided.

During retraction and lowering of left lift cylinder 7, including the left intermediate carriage 5, the same and opposite mechanical effect occurs at the chains, sprockets, and chain anchor blocks when the left intermediate carriage 5 descends, and therefore causes the rising platform assembly 4 to be lowered at twice the speed and distance as that provided by left lift cylinder 7.

As shown in greater detail in FIGS. 8, 8A, 8B, 8C, 8D and 9, the right intermediate carriage 6 preferably has a structural frame 6a which may be typically fabricated from cut, machined, bent, or formed mild steel, aluminum or other suitable materials and common shape structural members, which are fitted and welded together into a single welded unit for example. A right side hydraulic lift cylinder upper mounting tube 6b generally in the shape of a round tube extends through square tube support member 6L and is welded into place for load bearing strength. A front exterior guide member 6c and a rear exterior guide member 6d are welded into place at the front and rear faces of structural frame 6a. Front interior guide member 6e (hidden from view) and rear interior guide member 6h (partially hidden from view) are comprised of square structural tube and welded into place at the interior front and rear surfaces respectively of structural frame 6a. Upper sprocket shaft 6i and lower sprocket shaft 6j each extend through the wall of structural frame 6a and are welded into place for load bearing strength. A main frame right chains anchor block elongated clearance opening 6k provides a clearance path for the main frame right chains anchor block 39 as it extends through this opening and is attached to the main frame 2. Additionally, as the right intermediate carriage 6 is raised and lowered within main frame 2, it slides at, for example, six exterior guide bearings 26, which are preferably comprised of plastic (or other optional suitable surface contact bearing materials), and are attached to intermediate carriage 6 by a series of exterior guide bearing fasteners 27. The six exterior guide bearings 26 (three at the front and three at the rear) slidably engage within the vertical channels effectively provided at main frame 2 by right rear guide channel member 2g and right front guide channel member 2i. Likewise, the three exposed sides of front interior guide member 6e (hidden from view), and the three exposed sides of rear interior guide member 6f (partially hidden from view) comprise front interior guide member sliding surfaces 6g (hidden from view), and rear interior guide member sliding surfaces 6h (partially hidden from view) respectively, for vertical sliding engagement of right intermediate carriage 6 within the main frame 2.

Top roller chain 28a of the right intermediate carriage 6 engages upper sprocket 30 for free rotation at upper sprocket shaft 6i, and is held into place by sprocket spacer washers 31, upper sprocket retainer plate 32, and retainer plate fasteners 33. Bottom roller chain 28b of the right intermediate carriage 6 engages lower sprocket 34 for rotation at lower sprocket shaft 6j, and is held into rotatable position by sprocket spacer washers 31, lower sprocket retainer plate 36, and retainer plate fasteners 37. The top roller chain 28a and bottom roller chain 28b are each connected to right roller chains rising platform anchor block 40 by master links 29d and 29b. Likewise, the opposite ends of top roller chain 28a and bottom roller chain 28b are each connected to right top roller chain frame anchor block 38a, and right bottom roller chain frame anchor block 38b by roller chain master links 29a and 29c. These two small anchor blocks (29a and 29b) are then fastened by four threaded cap screws (not shown) to larger right roller chains main frame anchor block 39, which is further fastened by four additional threaded cap screws (not shown) at right roller chains anchor block mounting holes 2n (shown in detail in FIG. 5E) of main frame 2.

A rectangular protrusion 39a is provided at right roller chains main frame anchor block 39 for the purpose of further engaging and securing main frame right roller chains anchor block 39 within rectangular opening 2v (shown in detail in FIG. 5E) of main frame 2. The purpose of this is to provide additional strength, reliability, and self-location of the anchor block 39 at main frame 2, such that a transfer of the expected vertical shear force loads from the roller chains 28a and 28b into the main frame 2 need not entirely rely upon the strength of the four anchor block fasteners (not shown). Thus, the rectangular protrusion 39a at left roller chains main frame anchor block 39 engaged with main frame right roller chains anchor block rectangular opening 2v provides an effective and more robust and positive keyed mechanical connection.

The two-stage mechanical apparatus that provides the doubling of the stroke dimension of the hydraulic lift cylinders 6 and 7 at the rising platform assembly 4, is provided for example, when right intermediate carriage 6 is raised a given distance by the right hydraulic lift cylinder 8. In this instance the chains and sprockets also advance upward by the same distance along with the right intermediate carriage 6. However, because each end of the right roller chains 28a and 28b are fixed at one end to the main frame 2, by chain anchor blocks 38a, 38b, and 39; the right roller chains rising platform anchor block 40 is caused to advance upward at twice the speed and distance as that of the vertical movement of right intermediate carriage 6. Concurrently, since the right roller chains rising platform anchor block 40 is also fastened (by threaded cap screws for example; not shown) to the rising platform assembly 4, the rising platform assembly 4 also advances upward at twice the speed and distance as that of the right intermediate carriage 6. Thus, the two-stage mechanical advantage of the vertical displacement mechanism 3 at the right side of the apparatus is provided.

During retraction and lowering of right lift cylinder 8, including the right intermediate carriage 6, the same and opposite mechanical effect occurs at the chains, sprockets, and chain anchor blocks when the right intermediate carriage 6 descends, and therefore causes the rising platform assembly 4 to be lowered at twice the speed and distance as that provided by right lift cylinder 8.

Accordingly, as described above, both the right and left lift cylinders 7 and 8, including the right and left intermediate carnages 5 and 6 all respectively, all work together to simultaneously raise and lower the rising platform assembly 4.

Figure 10:
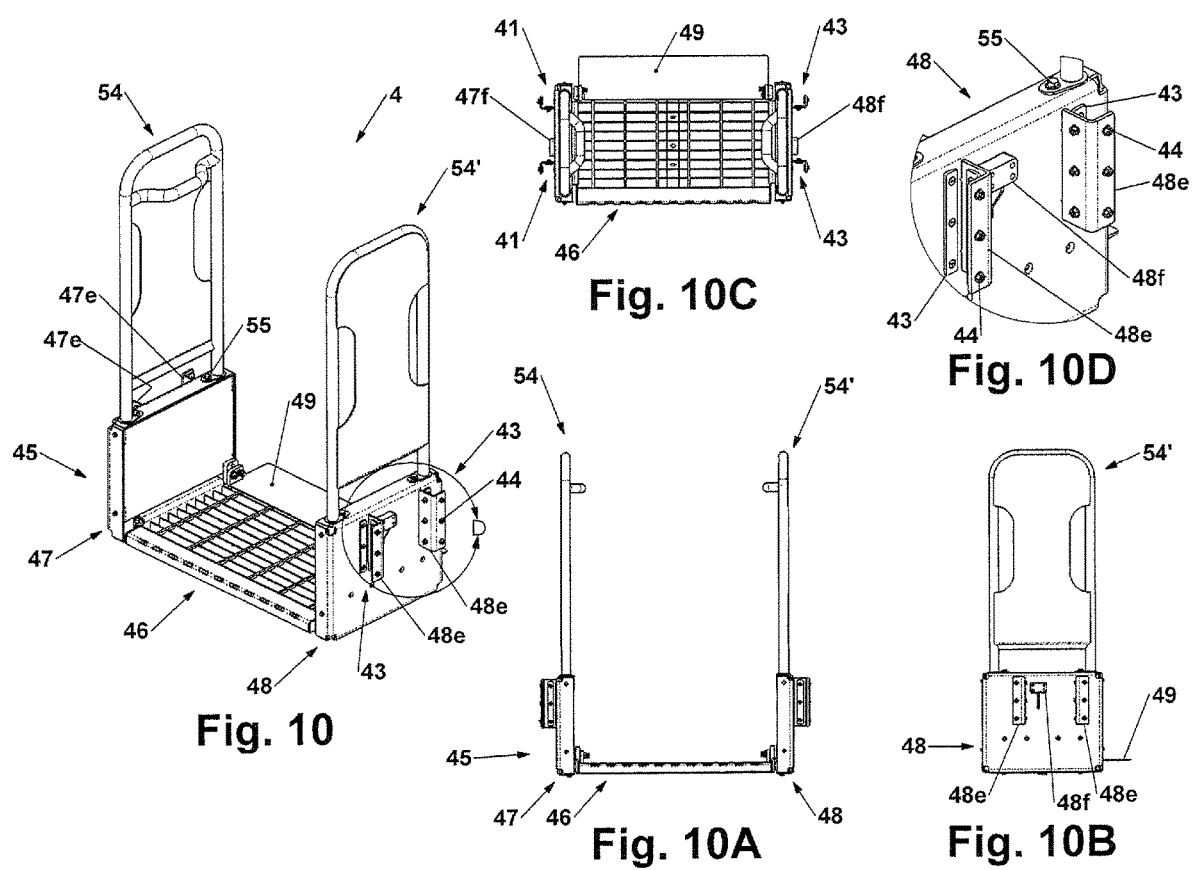
FIG. 10 is a front upper left perspective view of the vertical displacement mechanism also shown in FIGS. 1 through 4.
Figure 11:
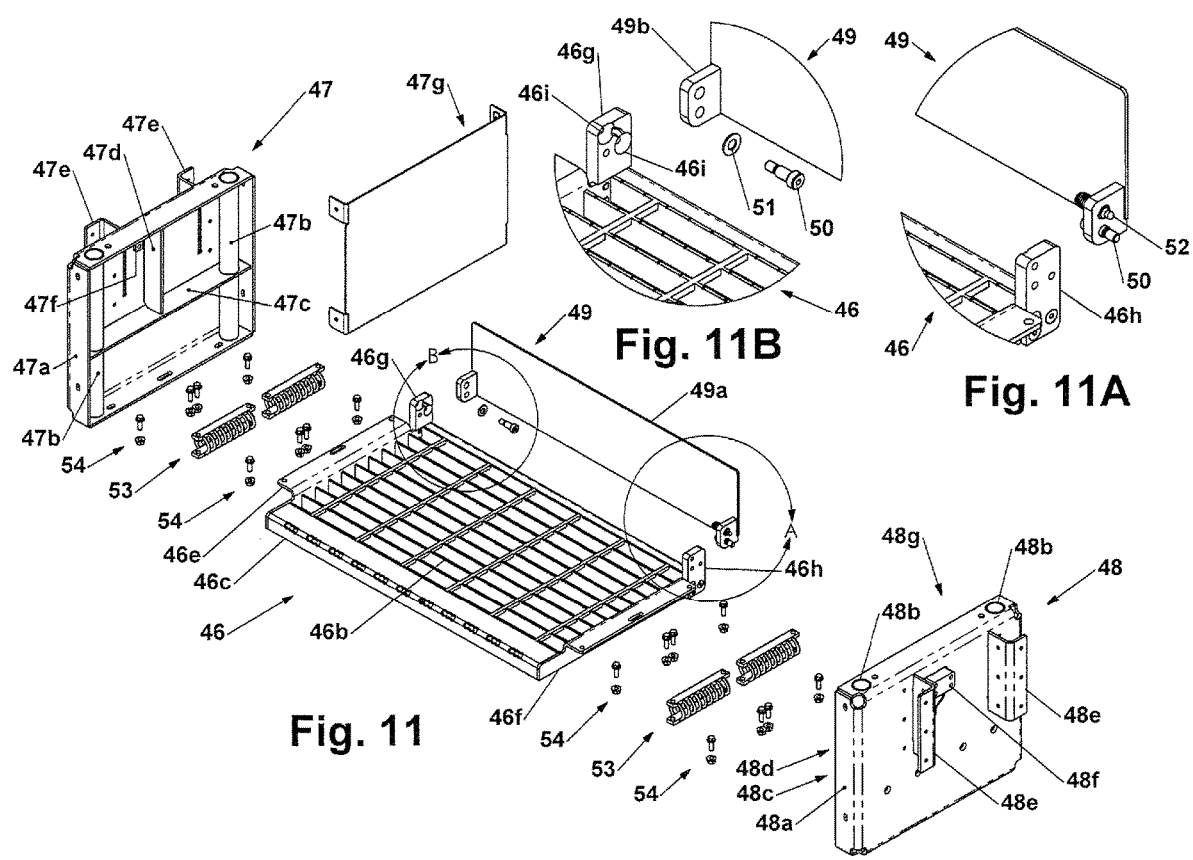
FIG. 11 is an exploded front upper left perspective view thereof.

FIGS. 10 through 11A show details of the rising platform assembly 4 including lower subassembly 45 comprised of left sliding support assembly 47 and right sliding support assembly 48.

As shown in FIG. 11, the primary members of the left sliding support assembly 47 and right sliding support assembly 48 are left sliding support main structural member 47a, and right sliding support main structural member 48a, which may be typically fabricated from cut, machined, bent, or formed mild steel, aluminum or other suitable materials and common shape structural members, which is fitted and welded together into a single welded unit for example.

Left sliding support main structural member 47a, and right sliding support main structural member 48a, each may include handrail mounting tubes 47b and 48b, horizontal support plates 47c and 48c (48c not visible), vertical support plates 47d and 48d (48d not visible), linear bearing mounting angles 47e and 48e, and finally rising platform left side chains anchor block mount 47f, and rising platform right side chains anchor block mount 48f.

Rising platform left and right side sliding support structural member covers 47g and 48g (48g not shown) are fastened by threaded hardware onto left sliding support main structural member 47a, and right sliding support main structural member 48a.

As shown in FIGS. 10 through 10D, left sliding support assembly 47 and right sliding support assembly 48 includes three left and three right side rising platform guide bearings 41 and 43. These are attached to the interior faces of left sliding support linear bearing mounting angles 47e and right sliding support linear bearing mounting angles 48e respectively, by a series of left side guide bearing fasteners 42, and a series of right side guide bearing fasteners 44. The left and right rising platform guide bearings, which are preferably comprised of plastic (or other optional suitable surface contact bearing materials), respectively and slidably engage with the left intermediate carriage front interior guide member 5e, left intermediate carriage rear interior guide member 5f, right intermediate carriage front interior guide member 6e, and right intermediate carriage rear interior guide member 6f; at the respective intermediate carriages front interior guide member sliding surfaces 5g, 5h, 6g, and 6h shown in FIGS. 6 through 9.

Thus, the engaged members serve as guides or channels providing vertical sliding freedom of movement, lateral support and guidance of the left sliding support assembly 47 and the right sliding support assembly 48 of the rising platform lower subassembly 45, which further includes the rising platform assembly 4, relative to both the left and right intermediate carriage assemblies 5 and 6 previously described.

As shown in FIG. 11, the central portion of the rising platform lower subassembly 45 is further comprised of rising platform step member 46. Rising platform step member 46 may be typically fabricated from cut, machined, bent, or formed mild steel, aluminum or other suitable materials and common shape structural members, which is fitted and welded together into a single welded unit for example.

Rising platform step member 46 is comprised of step member grating 46b which in the present embodiment provides a high traction surface and debris shedding capabilities; however other step member materials may be optionally selected by design. The remaining components of step member 46 includes step member front support 46c, step member rear support 46d, left edge plate 46e, right edge plate 46f, left vertical plate 46g, and right vertical plate 46h.

Rising platform step member 46 is attached to and supported by four flexible support members 53 (two at each side) extending between respective left edge plate 46e and right edge plate 46f and the respective lower edge surfaces of left sliding support assembly 47 and the right sliding support assembly 48 by a series of threaded fasteners 54 at each side.

One purpose of this design feature is to provide an increased level of flexibility and mechanical deflection forgiveness between these assemblies to help ease dimensional specifications and help ensure that the design works well in harsh outdoor environments for example. This increased flexibility further provides improved resistance of the apparatus to a certain amount of potential impact damage or mechanical deflection in a rugged mobile equipment environment for example, while still allowing the rising platform system to operate properly, thus maximizing the serviceability of the entire device. For example, if either of the vertical side walls of the main frame 2 or the rising platform assembly 4 sustained damage resulting in the vertical sliding members of these assemblies to become misaligned or otherwise non-parallel, the rising platform assembly 4 would remain much more likely to continue operating properly. Without the additional design flexibility provided by flexible support members 53, binding would be more likely to occur with as little as 0.13 inches (3.3 mm) of misalignment between the primary sliding assemblies. Therefore, incorporation of the flexible support members 53 between the rising platform step member 46, left sliding support assembly 47, and the right sliding support assembly 48 provides another advantage of the present disclosure.

Rising platform step member 46 further includes pivotable deck plate assembly 49 at the rear portion of rising platform assembly 4. The purpose of pivotable deck plate assembly 49 is to both provide a vertical kick plate for workers of machine operators while standing and riding on the rising platform assembly 4, and to bridge the gap that would otherwise exist in the walkway surface between the main frame top plate 2j of main frame 2 and the of step member grating 46b of the rising platform assembly 4 when at the fully raised position. Pivotable deck plate assembly 49 would be manually flipped or folded down to bridge across the gap.

Pivotable deck plate assembly 49 includes a deck plate traction surface member 49a, left end plate 49b, right end plate 49c, two pivot fasteners 50, two pivot fastener washers 51, and at least one pivotable deck plate positional detent lock mechanism 52. When pivotable deck plate assembly 49 is at either of the flipped up vertical or flipped down horizontal position, positional detent lock mechanism 52 engages with pivotable deck plate detent reliefs 46i provided at either of step member left vertical plates 46g or 46h to help secure the pivotable deck plate assembly 49 at either of the vertical or horizontal positions as required.

The pivotable deck plate assembly 49 is designed to remain in the flipped up vertical position whenever the rising platform assembly 4 is in the process of being either raised or lowered. This is necessary to avoid any expected mechanical contact and interference with the components of the folding steps mechanism 9, particularly when set to the folded up configuration 9a during raising and lowering operation of the rising platform assembly 4.

Additionally, when the pivotable deck plate assembly 49 is in the flipped down horizontal position while the rising platform assembly 4 is at the fully raised position, pivotable deck plate assembly 49 is designed to automatically become set to the flipped up vertical position by its expected contact engagement with the main frame top plate 2j of main frame 2, and therefore becomes automatically pushed up into the correct position, when the rising platform assembly 4 begins moving in a downward direction during a descent or lowering operation.

Optionally, the pivotable deck plate assembly 49 may be designed to be automatically moved as required by series of additionally designed mechanical linkages engaged with and powered by the vertical movements of the rising platform assembly 4.

Further optionally, the pivotable deck plate assembly 49 may be designed to be actively and automatically moved as required by a powered actuator, such as for example; by at least one small hydraulic or pneumatic air cylinder, an electric motor or linear actuator, an electromechanical solenoid, an electromagnet, or any other foreseeable types of actuating devices. Therefore, incorporation of automatic actuation of the pivotable deck plate assembly 49 represents another advantage of the present disclosure.

Figure 12:
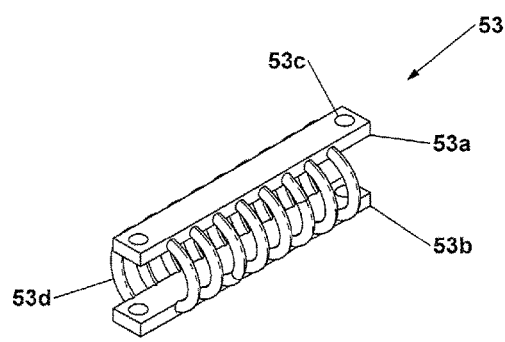
FIG. 12 is a front upper left perspective view of a flexible support member shown in FIG. 11.
Figure 12C:
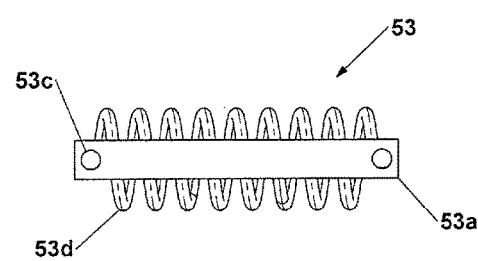
FIG. 12C is a top view of a flexible support member shown in FIGS. 11 and 12.
Figure 12A:
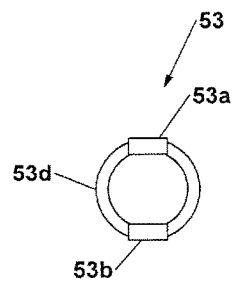
FIG. 12A is a front view of a flexible support member shown in FIGS. 11 and 12.
Figure 12B:
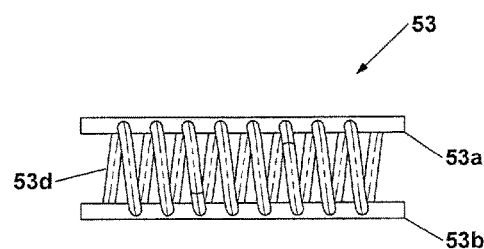
FIG. 12B is a right side view of a flexible support member shown in FIGS. 11 and 12.

As shown in FIGS. 11 through 12C, the flexible support members 53 of the lower subassembly 45 of rising platform assembly 4, may include wire-rope vibration-damping mounts. The flexible support members 53 as described previously, are flexible members typically comprised of a flexible supporting element 53d made up of a coil of stainless steel wire cable that is wound into or otherwise clamped into upper and lower mounting plates 53a and 53b. The upper and lower mounting plates 53a and 53b may be comprised of at least two to four aluminum bars which may be optionally chromate coated for additional corrosion resistance. A series of mounting holes 53c are provided at upper and lower mounting plates 53a and 53b for attachment to the lower subassembly 45 of rising platform assembly 4. Therefore, and as stated previously, incorporation of the flexible support members 53 between the rising platform step member 46, left sliding support assembly 47, and the right sliding support assembly 48 represents another advantage of the present disclosure.

As shown in FIGS. 10 through 10D, and in detail in FIGS. 13 through 13C, a pair of rising platform left and right handrail assemblies 54 and 54' may be attached to the lower subassembly 45 of rising platform assembly 4. Handrail assembly 54 may be typically fabricated from cut, machined, bent, or formed mild steel, aluminum or other suitable materials and common shape structural members, which is fitted and welded together into a single welded unit for example. Handrail assembly 54 is comprised of handrail main tube member 54a, cross support tube 54b, inboard handle 54c, guard plate 54d, and handrail attachment plates 54e. Attachment of the left and right handrail assemblies 54 and 54' is accomplished by concentric engagement of the lower portions of handrail main tube member 54a within the respective handrail mounting tubes 47b and 48b of their respective left sliding support assembly 47 and right sliding support assembly 48. The left and right handrail assemblies 54 and 54' are secured at handrail attachment fasteners 55 at fastener mounting holes 54f. The concentric engagement and overlap of the lower portions of handrail main tube member 54a within the respective handrail mounting tubes 47b and 48b of their respective left sliding support assembly 47 and right sliding support assembly 48 provides excellent mechanical support and resistance to deflection from lateral loads that are expected and likely to occur at the top portions of left and right handrail assemblies 54 and 54' while in use by persons such as workers, vehicle operators and personnel.

The combination of concentric engagement and overlap of the lower portions of handrail main tube member 54a within the respective handrail mounting tubes 47b and 48b, as well as the ability to easily disassemble and re-assemble the left and right handrail assemblies 54 and 54' at the rising platform assembly 4 for ease of replacement as needed for example due to damage from impacts, represents another advantage of the present disclosure.

As shown in FIGS. 1 through 4 and FIGS. 14, 14A, 15, 15A, and 15B, the folding steps mechanism 9 utilizes in one embodiment two hydraulic cylinders or actuators 72 and 72' to control the movement and orientation of the three access step members located just above the rising platform step member 46 of lifting platform 4. Hydraulic cylinders or actuators 72 and 72' are attached to back support plate 2a of main frame 2 at folding steps cylinder support bracket mounting holes 2w, by eight hydraulic cylinder mounting bracket mounting fasteners 74 (not shown).

Generally, it should be understood that the travel speed and motion of the two hydraulic cylinders or actuators 72 and 72' is ideally the same by controlling both the pressure and flow of hydraulic fluid provided to the cylinders through various electromechanical means 104 and methods known to the fluid power industry. Various electromechanical means 104 and methods may include for example flow dividers, pressure compensators, electronic flow controls and valves and third cylinder circuit arrangements, and the like for example, which may be optionally included to operate the present disclosure within a complete prime mover and hydraulic system package (not shown).

As generally described above, it may be optional to provide only one hydraulic cylinder or actuator 72 for example, to actuate the folding steps mechanism 9. Other foreseeable types of mechanical actuators may also be optionally used while remaining within the scope of the present disclosure.

In one alternate embodiment, three step members (folding bottom step member 56, middle step member 57, top step member 58), are mechanically linked in a fashion comparable to a series of at least two 4-bar mechanical linkages to ensure they all move together in a controlled way. The folding steps mechanism 9 is designed to provide a conventional fixed set of steps or a stairway when moved and set to the folded-down or deployed position. Alternately, the folding steps mechanism 9 is also able to be moved and set to become folded up to a retracted and out of the way position whenever the lifting platform 4 is being either raised or lowered. This mode of operation or folded up configuration 9a is most clearly shown in FIG. 14A.

As shown in detail in FIGS. 14, 14A, 15, 15A, and 15B, the folding steps mechanism 9 includes (in one embodiment) two hydraulic cylinders or actuators 72 and 72' to control the movement and orientation of three access steps located just above the rising platform step member 46 of lifting platform 4. In this embodiment, three step members (folding bottom step member 56, middle step member 57, top step member 58), are mechanically linked in a fashion comparable to a series of at least two 4-bar mechanical linkages by four folding steps support linkages 69.

The three folding step members 56, 57, and 58 may be typically fabricated from cut, machined, bent, or formed mild steel, aluminum or other suitable materials and common shape structural members, which is fitted and welded together into a single welded unit for example. Each central portion of the folding step members is preferably comprised of step member grating (the same material as used at rising platform step member 46) in which in the present embodiment provides a high traction surface and debris shedding capabilities; however other step member materials may be optionally selected by design.

It may be further noted that the dimensional width of each of the folding step members 56, 57, and 58 is approximately the same, however the depth dimensions may optionally and preferably successively decrease such that the outer-most portion of each step is set at a dimension at least slightly further back from the outer-most portion of its preceding step member located just below. This feature selected by design, offers the benefit of improved ergonomics for workers, vehicle operators and personnel using the steps in the folded down position and represents another key aspect and benefit advantage of the present disclosure in combination with the other key and novel functional aspects of the present disclosure.

Folding bottom step member 56, middle step member 57, top step member 58, are each pivotally attached to six respective folding steps support brackets 59, at respective folding steps support bracket elastomeric isolators 62, by a series of six respective concentric pivot fastener bushings 62a (not shown) and a series of six respective threaded pivot fasteners with threaded nuts 61. Each of the six respective folding steps support brackets 59 are attached to the interior of back support plate 2a of main frame 2, at folding steps support brackets mounting holes 2p (shown in FIG. 5A), by 24 mounting fasteners 60 (not shown).

A series of respective folding steps limiting straps 63 are provided for engagement with each of the folding step members 56, 57, and 58 for the purpose of positively supporting and limiting the downward movement of each of the step members when set to the folded down or deployed position. A series of six limiting strap upper pivot fasteners 64, six limiting strap support brackets 67, and twelve limiting strap support bracket fasteners 68 (not shown) are attached to the interior back support plate 2a of main frame 2, at limiting strap support brackets mounting holes 2q (shown in FIG. 5A). A series of six folding steps limiting strap lower pivot fasteners 65, fasten and engage six respective limiting strap guide slots 66, at holes at each side of the respective folding step members 56, 57, and 58, thus allowing free upward movement of the steps when they are being pivoted to the folded configuration.

Four folding steps support linkages 69 are each further comprised of respective structural tube members 69a further including threaded connections at each end, threaded spherical rod ends 70 at each end, and respective spherical rod end threaded fasteners 71 which pivotally attach each of the respective four support linkages 69 to their respective folding step members 56, 57, and 58.

Therefore, the folding steps mechanism 9 of the access platform system with integrated folding steps mechanism 1 provides an efficient and compact arrangement and use of space since the lifting platform 4 passes through the same relative volume of space as occupied by the folding steps mechanism 9 when the folding steps assembly 9 is at the folded down or deployed position. Additionally, the folding steps mechanism 9 may be actuated to freely move upward and downward under power by means of a control switch for example to engage selected power and control of the mechanism. Optionally, the upward and downward movement of the folding steps mechanism 9 may be automatically controlled in desired coordination by a programmed electronic controller 100, including position limit switches, proximity switches, and other similar sensor input means in combination with the control and movement of the rising platform assembly 4 as it is either raised or lowered during automated operation. This automated sensing and control aspect and feature represents another advantage of the present disclosure.

Therefore, the disclosed apparatus provides a folding steps assembly 9 that when folded-up to allows the lifting platform 4 to freely move upward and downward under power by means of at least one control switch to engage and select power and control of the apparatus. This mode of operation provides the benefits and advantages of power-assisted lifting and lowering ingress and egress of workers or machine operators involving large elevated vehicles or mobile equipment. Alternatively, while in the folding steps assembly 9 is in the folded down or deployed position, all the folding steps are secured into place as a typical stairway or ladder. This mode of operation may represent a default mechanical configuration of the current disclosure requiring no power to permit normal and traditional ingress and egress of workers or machine operators involving large elevated vehicles or mobile equipment in the event that equipment is turned off or as the result of a power outage, for example. This overall combination of automated and default mechanical configurations and design features offer several advantages, as discussed earlier.

Further enhancements to some embodiments of the locomotive access system are described below. One of their aims is to increase the utility and ease of use, and durability of the system.

As mentioned earlier, those enhancements include ways to detect obstructions by adding functionality to a control logic to prevent damage to the system if an obstacle is encountered which impedes or prevents the free movement of the system. Examples of obstructions which may prevent normal operation include snow and ice buildup, debris on the ground under the main lifting platform, or debris buildup on moving components of the system.

Methods of detection include means for current sensing in communication with one or more motors that drive a step or main platform and optionally providing timeout limits. If a pre-set time or current threshold is exceeded, indicating a blocked or jammed condition or other mechanical failure, the platform system returns to the home configuration. Optionally, a light and/or auditory signal is activated to alert the user to clear the obstruction. Such enhancements are expected to improve the long-term durability of the system.

Another enhancement relates to improved user safety. As noted earlier, one or more occupant detection devices may be provided in some embodiments to sense when someone has boarded the system. These devices may include a foot switch which is activated by a user's weight. Alternatively, a proximity switch may be installed which detects the presence or absence of a user in the stairwell. When a user is detected, certain functionality may be disabled to prevent injury. For example, if a user is present on the steps, the system cannot be called to the full up or full down positions.

These improvements improve safety not only for users, but also for other personnel near the system.

As a further possible enhancement, one or more remote activation means may be provided. If a user wishes use the system, that user may have the option of calling the system using a fob or like device. If the operator of the ground-based vehicle or locomotive desires, this method can also be used to improve safety and security of the system by only allowing it to be used when the fob is in close proximity to the platform system. This will help ensure that only trained and qualified personnel are able to activate the locomotive access system.

Optionally, an access denial setting may be added to the control system. Currently, there is no method to prevent unauthorized users from climbing aboard for example a locomotive in an unsecured location. In some embodiments, a locomotive access system for example has the ability to prevent access by deploying means 102 for denying access such as features described earlier that fold the steps and raise the lift platform to deck height. Adding this setting to the control system enables an operator to "lock" the locomotive, thereby preventing unauthorized access to the locomotive. The system could be locked and unlocked using a remote fob, RFID keycard, keypad, or by deploying other security technology.

In a preferred embodiment, the hydraulic cylinders are replaced by one or more electric motors coupled with chains or belts. One advantage of such an arrangement is to provide an electric solution. In the railway locomotive environment, there is a plentiful supply of air and electricity, but little hydraulic fluid. Additionally, hydraulic cylinders take up a lot of space in the "width" direction of the steps, so it may be difficult to synchronize left and right hydraulic lift cylinders. Also, long hydraulic cylinders are required. In contrast, a chain drive is more tolerant of dirt or debris than alternative actuators (power screws for example).

In a preferred embodiment, a shaft is provided across the bottom of the steps with a sprocket on each end. An idler is located at the top of the steps so that the chain can form a complete loop to enable the carriage to be both lifted and lowered using the motor (in case ice or snow or something provides more resistance than could be overcome by gravity). The carriage is provided with a chain mount that takes the place of a few of the chain links and may also include a jack screw for adjusting chain tension.

Desirably, the drive shaft drives both left and right carriages at the same time and ensures both sides are in sync (i.e., they rise and lower at the same rate and at the same time). The motor may drive through a planetary gearbox to reduce speed and amplify torque. At the output of the gearbox is a drive sprocket which drives the main lift shaft through a chain. This embodiment packages behind the steps, in contrast to the hydraulic cylinders which need to be on the side of the mechanism.

Changes and modifications in the specifically described embodiments may be carried out without departing from the principles of the present disclosure, which is intended to be limited only by the scope of the appended claims.

What is claimed is:

1. An access platform system for enabling access to and from elevated ground-based structures, vehicles, and mobile equipment, the system having:
    A. a main frame that is attached to or juxtaposed with one or more of the ground-based structures, vehicles, or mobile equipment,
    B. a vertical displacement mechanism that is attached to the main frame, the vertical displacement mechanism having:
        a platform assembly for permitting personnel to stand or ride to raise personnel to an elevated level or lower them therefrom to a lower or ground level;
    C. a folding steps assembly attached to the main frame, having:
        steps;
        a folding steps mechanism to enable the steps to be displaceable to, from and between a folded up configuration and a folded down configuration,
        the folded up configuration allowing the vertical displacement mechanism to freely move upwardly and downwardly without interference by the steps;
        the folded down configuration securing the steps in place, the folded down configuration being a default configuration that permits ingress and egress of persons to or from the ground-based structures, vehicles, and mobile equipment; and
    D. an electronic controller associated with the folding steps mechanism, so that in combination the electronic controller and folding steps mechanism influence a position or movement of the vertical displacement mechanism and/or the folding steps assembly, the platform assembly being configured to be deployable within an area circumscribed by the folding steps.

2. The access platform system of claim 1, wherein the electronic controller includes one or more position limit switches, proximity switches, and/or other sensors in combination with the vertical displacement mechanism as the vertical displacement mechanism is raised or lowered.

3. The access platform system of claim 1, further comprising an electromechanical means for folding and unfolding the steps.

4. The access platform system of claim 1, wherein the default configuration requires no electrical power.

5. The access platform system of claim 1, wherein the steps have a width that lessens with height above the ground.

6. The access platform system of claim 1, further having an electromechanical means for folding and unfolding the steps, the electromechanical means including an electrical circuit that is closable by a control switch, thereby activating a steps control assembly.

7. The access platform system of claim 1, further including means for detecting obstructions by adding one or more features to a control logic to prevent damage to the system if an obstacle is encountered which impedes or prevents free movement of the system, such obstructions preventing normal operation and including snow and ice buildup, debris on the ground under the main lifting platform, or debris buildup on moving components of the system.

8. The access platform system of claim 1, further including means for current sensing in communication with the electronic controller.

9. The access platform system of claim 8, further including means for setting and observing timeout limits so that if a pre-set time or current threshold is exceeded, the means for setting and observing will indicate a blocked or jammed condition, and the platform system will return to a home configuration.

10. The access platform system of claim 9, further including a light and/or auditory signal that is activated to alert a user to clear an obstruction.

11. The access platform system of claim 1, further including an occupant detection device to sense when an operator has boarded the platform system.

12. The access platform system of claim 11, wherein the occupant detection device includes a foot switch which is activated by a user's weight.

13. The access platform system of claim 11, further including a proximity switch which detects a presence of a user in a stairwell so that when a user is detected, the platform system cannot be called to a full up or full down position.

14. The access platform system of claim 1, further including a remote activation means so that if a user wishes to use the platform system, that user may have an option of calling the platform system using a fob.

15. The access platform system of claim 14, wherein activating the platform system is enabled if the fob is in proximity to the platform system.

16. The access platform system of claim 15, further including means for denying access that is provided to the electronic controllers so that unauthorized users are prevented from climbing aboard.

17. The access platform system of claim 16, wherein the means for denying access folds the steps and raises the lift platform to or above a deck height, thereby preventing unauthorized access.

18. The access platform system of claim 1, wherein the platform assembly further includes a compliant linear bearing mount so that under extreme loading scenarios, binding is minimized.

19. The access platform system of claim 1, wherein the platform assembly includes an intermediate carriage assembly that is raised and lowered by a chain or cable driven by an air-powered, hydraulic, or electric motor that acts on a drive sprocket or through a torque multiplication or reduction device.

20. An access platform system for facilitating access to ground-based structures, vehicles, and mobile equipment, the system having:
  A. a main frame;
  B. a vertical displacement mechanism attached to the main frame;
  C. a platform assembly comprising:
    a left intermediate carriage assembly;
    a right intermediate carriage assembly;
    a left lift cylinder having a stroke;
    a right lift cylinder having a stroke;
  D. a two-stage apparatus for influencing the stroke of the right and left lift cylinders,
  one or more roller chains that guide the platform assembly, the chains engaging sprockets mounted on the intermediate carriage assemblies which move together at a same speed and through a same vertical distance under the influence of the lift cylinders,
  the chains and sprockets moving within the intermediate carriage assemblies, thereby influencing the speed and travel range of motion of the vertical displacement mechanism so that a travel speed and motion of the lift cylinders is equalized by controlling a pressure or flow of fluid provided to the cylinders, or by controlling the pressure and flow of fluid provided to the cylinders, the left intermediate carriage assembly and right intermediate carriage assembly each including guide bearings for vertical sliding engagement with vertical channel members associated with the main frame;
  left and right sides of the vertical displacement mechanism also including guide bearings for vertical sliding engagement with vertical interior guide members within the left intermediate carriage assembly and right intermediate carriage assembly, thereby permitting free vertical movement, mechanical alignment and guidance during relative motion of the assemblies during operation;
  a folding steps assembly having folding steps attached to the main frame, the folding steps assembly also having:
    a folded up configuration that allows the vertical displacement mechanism to move upwardly and downwardly without interference by the steps, the folded up position blocking access to the ground-based structures, vehicle, and mobile equipment; and
    a folded down configuration in which the steps are secured in place, the folded down configuration representing a default configuration that requires no electrical power to permit ingress and egress of persons to or from the ground-based structures, vehicle, and mobile equipment in the event that electrical power is interrupted, the platform assembly being configured to be deployable within an area circumscribed by the folding steps.

* * * * *